United States Patent
Stonehocker et al.

(10) Patent No.: US 11,978,454 B2
(45) Date of Patent: May 7, 2024

(54) MULTIPLE SERVICE LEVELS FOR AUTOMATIC SPEECH RECOGNITION

(71) Applicant: SoundHound, Inc., Santa Clara, CA (US)

(72) Inventors: Timothy P. Stonehocker, Sunnyvale, CA (US); Zizu Gowayyed, San Francisco, CA (US); Matthias Eichstaedt, San Jose, CA (US); Seyed Majid Emami, Cupertino, CA (US); Evelyn Jiang, Cupertino, CA (US); Ryan Berryhill, Toronto (CA); Mathieu Ramona, Cachan (FR); Neil Veira, Toronto (CA)

(73) Assignee: SOUNDHOUND AI IP, LLC, Santa Clara, CA (US)

( * ) Notice: Subject to any disclaimer, the term of this patent is extended or adjusted under 35 U.S.C. 154(b) by 429 days.

(21) Appl. No.: 17/447,823

(22) Filed: Sep. 16, 2021

(65) Prior Publication Data
US 2023/0082955 A1 Mar. 16, 2023

(51) Int. Cl.
G10L 15/30 (2013.01)
G10L 15/16 (2006.01)
G10L 15/26 (2006.01)

(52) U.S. Cl.
CPC ............ G10L 15/30 (2013.01); G10L 15/16 (2013.01); G10L 15/26 (2013.01)

(58) Field of Classification Search
USPC ..................................................... 704/1–504
See application file for complete search history.

(56) References Cited

U.S. PATENT DOCUMENTS

| | | | | |
|---|---|---|---|---|
| 9,575,963 | B2* | 2/2017 | Pasupalak | G06F 40/35 |
| 10,418,032 | B1* | 9/2019 | Mohajer | G10L 15/1815 |
| 11,594,221 | B2* | 2/2023 | Thomson | G10L 15/187 |
| 2015/0066479 | A1* | 3/2015 | Pasupalak | G06F 16/90332 |
| | | | | 704/9 |
| 2018/0182398 | A1* | 6/2018 | Halstvedt | G06F 16/3329 |
| 2021/0233530 | A1* | 7/2021 | Thomson | G10L 15/30 |

(Continued)

OTHER PUBLICATIONS

Daghero, Francesco, Energy-Efficient Quality Adaptation for Recurrent Neural Networks, 2019.

(Continued)

*Primary Examiner* — Marcus T Riley
(74) *Attorney, Agent, or Firm* — Young's Patent Services; Bruce A. Young

(57) ABSTRACT

A system for performing automated speech recognition (ASR) on audio data includes a queue manager to receive a request to perform ASR on audio data, add the request to a queue of incoming requests, and determine a queue depth representing a number of requests in the queue at a given time. The system also includes a load supervisor to receive the request and the queue depth from the queue manager and assign a service level for the request based on the queue depth. In addition, the system includes a speech-to-text converter to receive the assigned service level for the request from the load supervisor, select an ASR model for the request based on the received service level, receive the audio data associated with the request, and perform ASR on the audio data using the selected ASR model.

38 Claims, 7 Drawing Sheets

(56) References Cited

U.S. PATENT DOCUMENTS

2023/0082955 A1* 3/2023 Stonehocker .......... G10L 15/16
704/235

OTHER PUBLICATIONS

Hinton, Geoffrey, et al., Deep Neural Networks for Acoustic Modeling in Speech Recognition, IEEE Signal Processing Magazine, Nov. 2012.
Nedevschi, et al., Hardware Speech Recognition for User Interfaces in Low Cost, Low Power Devices, DAC 2005, Jun. 13-17, 2005.
You, et al., OPENMP-Based Parallel Implementation of a Continuous Speech Recognizer on a Multi-Core System, ICASSP 2009.

* cited by examiner

| ASR# | Decoder | Acoustic Model | Language Model | Other Function | Capacity | Accuracy Decrease | Latency (ms) |
|---|---|---|---|---|---|---|---|
| 3 | A | 1 | NLM | No | 4 | 0.00% | 361 |
| 4 | A | 1 | NLM | Yes | 5 | 0.00% | 352 |
| 7 | A | 2 | NLM | No | 5 | 7.98% | 366 |
| 2 | A | 1 | SLM | Yes | 8 | -0.76% | 425 |
| 8 | A | 2 | NLM | Yes | 8 | 7.98% | 378 |
| 1 | A | 1 | SLM | No | 9 | -0.76% | 425 |
| 11 | B | 3 | NLM | No | 9 | 0.55% | 445 |
| 6 | A | 2 | SLM | Yes | 10 | 7.12% | 407 |
| 5 | A | 2 | SLM | No | 12 | 7.12% | 418 |
| 12 | B | 3 | NLM | Yes | 12 | 0.55% | 471 |
| 9 | B | 3 | SLM | No | 18 | 0.36% | 520 |
| 15 | B | 4 | NLM | No | 20 | 9.89% | 1481 |
| 10 | B | 3 | SLM | Yes | 23 | 0.36% | 2546 |
| 16 | B | 4 | NLM | Yes | 23 | 9.89% | 2027 |
| 13 | B | 4 | SLM | No | 38 | 10.67% | 4095 |
| 14 | B | 4 | SLM | Yes | 38 | 10.67% | 3259 |

| ASR# | Decoder | Acoustic Model | Language Model | Other Function | Capacity | Accuracy Decrease | Latency (ms) |
|---|---|---|---|---|---|---|---|
| 3 | A | 1 | NLM | No | 5 | 0.00% | 395 |
| 4 | A | 1 | NLM | Yes | 5 | 0.00% | 364 |
| 7 | A | 2 | NLM | No | 7 | 7.98% | 393 |
| 2 | A | 1 | SLM | Yes | 7 | -0.76% | 413 |
| 8 | A | 2 | NLM | Yes | 8 | 7.98% | 394 |
| 1 | A | 1 | SLM | No | 9 | -0.76% | 427 |
| 6 | A | 2 | SLM | Yes | 10 | 7.12% | 426 |
| 11 | B | 3 | NLM | No | 11 | 0.55% | 435 |
| 5 | A | 2 | SLM | No | 12 | 7.12% | 421 |
| 12 | B | 3 | NLM | Yes | 12 | 0.55% | 411 |
| 10 | B | 3 | SLM | Yes | 14 | 0.36% | 575 |
| 15 | B | 4 | NLM | No | 18 | 9.89% | 409 |
| 16 | B | 4 | NLM | Yes | 20 | 9.89% | 400 |
| 9 | B | 3 | SLM | No | 28 | 0.36% | 571 |
| 14 | B | 4 | SLM | Yes | 48 | 10.67% | 464 |
| 13 | B | 4 | SLM | No | 53 | 10.67% | 459 |

FIG. 6B

MULTIPLE SERVICE LEVELS FOR AUTOMATIC SPEECH RECOGNITION

BACKGROUND

Technical Field

The present subject matter relates to providing different service levels for automatic speech recognition or for other services.

Background Art

Automatic speech recognition (ASR) has become common in recent years with many commercial applications such as computerized dictation, instantaneous human language translation, and digital virtual assistant, among others. Current technology allows for recognition of speech by a wide variety of voices without any special design or training for a particular individual before use.

One class of applications that utilize ASR is interactive voice response (IVR) systems. IVR systems are used by a wide variety of businesses to allow customers to interact by voice over a phone. The IVR system provides an audio prompt or question and then receives a voice response from the customer. ASR is then used to convert the voice response to text that can be used to determine how to respond to the caller with information or additional questions. In some cases, the IVR system may offload the ASR task to a separate system, although other IVR systems may integrate ASR into the IVR system. The ASR load created by an IVR system may vary greatly, depending on the time of year, time of day, and other events such as a successful advertising campaign, a new product launch, or some external event that cannot be predicted, such as a natural disaster or activity from a competitor. The ASR system used has to be able to have enough capacity to support the maximum load, which may lead to wasted resources at times when the load is not at peak levels.

BRIEF DESCRIPTION OF THE DRAWINGS

The accompanying drawings, which are incorporated in and constitute part of the specification, illustrate various embodiments. Together with the general description, the drawings serve to explain various principles. In the drawings:

FIG. 6A and FIG. 6B are tables of experimental data from different ASR models;

DETAILED DESCRIPTION

Figure 1:
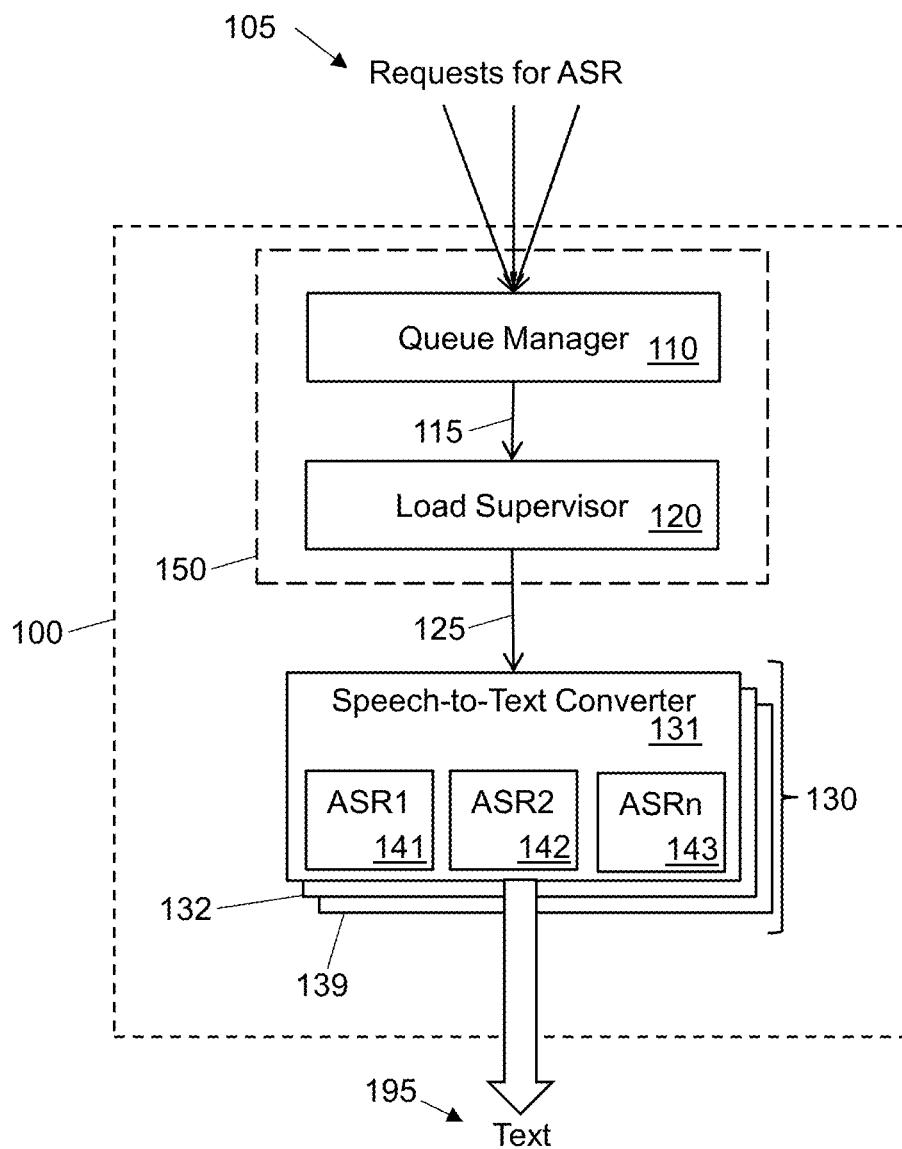
FIG. 1 shows a block diagram of an embodiment of a system for performing automated speech recognition (ASR) on audio data.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Systems, methods, and computer program products embodied in a computer-readable storage medium are described herein for automated speech recognition (ASR) and load balancing for a service having multiple service levels. For many applications, such as, but not limited to, ASR, the peak demand can be much more than average demand. Providing support for the peak demand without a service failure may require provisioning many more computing resources than are needed most of the time, which is expensive. The dynamic request handling described herein allows the use of higher performance models when possible but allows for dynamically switching to models with lower computing resource requirements to be able to handle the peak loads. This allows for less over-provisioning of resources which can save money and be good for the environment.

There are many ways to configure a service to trade off processing load and performance. One approach to graceful degradation is to route service requests to servers with different performance levels. This may be done by using lower-performance (e.g. older) equipment as a spill-over when demand exceeds the availability of the most high-performance equipment. Another variation is to turn off or put to sleep excess equipment or allocate it to other services when not needed. This requires that the restart time be fast enough to handle the fastest possible ramp-up in demand. Similarly, cloud-based resources can be provisioned on-the-fly, but even those types of resources may not be able to react quickly enough to meet peak demands effectively in some cases.

Another approach for handling the peak load is to allow graceful degradation of the service during those peak times. This may take the form of trading off performance against lower processing requirements so that provisioned resources are most efficiently used and all demand can be served even at times of peak demand. One way to do this is to have the service provide multiple versions of the service handler and then route requests to a particular service handler based on the current loading.

There are different ways that the computing resource requirements of a service handler may be characterized, depending on the embodiment. In some cases, the limiting factor for the service handler may be a memory footprint or a database size, but in many cases, the limiting factor may be processing cycles (i.e. execution time on the CPU). One way of characterizing the computing resource requirements for a service handler may be the number of simultaneous service requests that may be successfully handled simultaneously. This may be referred to as the capacity of the service handler on a particular hardware configuration where capacity is inversely proportional to the computing resources required (i.e. higher computing resource requirements lead to a lower capacity).

In the case of ASR, this can be accomplished by having multiple ASR models with different processing power vs. performance tradeoffs and routing audio to an ASR model having a lower performance and processing load when demand is high, and higher performance (e.g. more accurate and/or lower latency) models that have higher processing requirements when demand is low. While any number of different ASR models may be used, some embodiments may utilize two or three different ASR models to manage the demand. Compared to many other types of services, ASR is unusual because the time scale of recognizing a speech utterance can be many seconds. This requires more long-term resource allocation than other applications that may do algorithm selection on much faster-performing functions.

One form of lower performance for an ASR model is accuracy. Different ASR models may be created to have differing accuracy in recognizing speech with a lower accuracy ASR model requiring fewer computing resources than one having a higher accuracy rate. Another possible form of lower performance for an ASR model is latency. During high-frequency, bursty demand, high accuracy might still be possible by delaying the processing of requests, perhaps up to 1 second, without serious impact to the user experience. Other forms of performance tradeoffs that might be made for an ASR model include vocabulary size, languages supported, or any other change in the ASR model that may result in differing computing resources being used by the ASR model.

In at least one embodiment, it was determined that a 1 second latency for the ASR was the maximum to be allowed and different ASR models were created with different accuracy/capacity tradeoffs. Some embodiments may use two different ASR models having an accuracy difference of less than 10%, less than 5%, or about 1.5%, but having at least a 2× or at least a 3× difference in capacity. Other embodiments may use three different ASR models where the first ASR model has a baseline accuracy and capacity, a second ASR model has an accuracy degradation of less than 5% (e.g. about 1.5%) and a capacity of between 2× and 4× of the baseline, and a third ASR model has an accuracy degradation of less than 20% (e.g. about 15%) and a capacity of greater than 5× of the baseline. Embodiments may use any number of service handlers with any differences in their relative performance and capacity.

While any type of automatic speech recognition (ASR) service handler may be used in embodiments, including a single program that fully implements the ASR service handler and any partitioning of the ASR service handler into multiple interacting programs, many embodiments may provide an ASR service handler through the use a speech-to-text converter using an ASR model having different components, such as a decoder, an acoustic model, and a statistical language model. The decoder controls the overall speech-to-text process and may separate the stream of audio data into frames (i.e. a set of audio data representing a fixed amount of time such as, but not limited to, 10 ms) and generate a feature vector for a frame using functions such as, but not limited to, a discrete Fourier transform, mel frequency analysis, and cepstral analysis. The decoder may call on the acoustic model to convert the stream of feature vectors into senones, phonemes, or words, and the statistical language model to convert the stream of senones/phonemes/words created by the acoustic model into one or more candidate transcripts (which may have an associated probability of correctness). Some ASR models may also have an additional, optional function to further enhance performance at the cost of some reduced capacity. The decoder may determine which of the candidate transcripts provided by the statistical language model to use to deliver the text in response to a request and, in some embodiments, may use the optional function as a part of making the decision.

Different ASR models may be created that have different performance and capacity to handle requests having different service levels. The different ASR models may be prebuilt and provisioned on one or more servers so that they can be accessed to handle ASR service requests at the given service level as required. In other embodiments, an ASR model builder may construct an ASR model with an appropriate level of performance and capacity based on the service level of an incoming request by selecting different components.

An ASR model may be constructed using one of multiple different decoders. The different decoders may have different code bases or may be based on the same code base but be compiled using different options. Different decoders may also use different decoding algorithms, different processing of the stream of audio data, and/or generate different feature vectors from the stream of audio data. In at least some embodiments, different decoders may run their decoding algorithm at different rates, such as once every 10 milliseconds (ms), or once every 30 ms, on the incoming audio stream. Different decoders may also, in some embodiments, skip some portions of the incoming audio stream, such as only processing every other (or every third) frame of audio, to save on compute power at the expense of some accuracy. Different decoders used in different ASR models may utilize any known mechanism to perform the decoding function with different performance levels and different computational requirements.

An ASR model may be constructed using one of multiple different acoustic models. An acoustic model may be specific to a particular decoder or may be usable across multiple different decoders. An acoustic model may be created using a hidden Markov model, but an acoustic model may alternatively be implemented, at least in part, as a neural network (NN). Note that as the term is used herein and, in the claims, a neural network refers to an artificial neural network implemented with electronic components and/or computing instructions, not a network of biological neurons. The architecture (i.e. the number, types, and arrangement of nodes in the NN) may vary between the different acoustic models to provide different performance levels with varying computational requirements. For example a first acoustic model may utilize a first NN having a first number of hidden layers to attain a first performance level, and a second acoustic model may utilize a second NN having fewer hidden layers than the first NN but provide a lower performance level with a lower computational load.

An ASR model may be constructed using one of multiple statistical language models. The statistical language models provide a probability of word sequences being spoken. Some statistical language models may be implemented as an n-gram model which provides the probability of a given sequence of n words being spoken in a given order. The size and complexity of an n-gram model primarily depend on the vocabulary size and depth of n-gram (i.e. the length of the sequence of words). In some embodiments, the search beam width or top-n heap size may vary between statistical language models to vary the performance/capacity tradeoff. In other embodiments, a statistical language model may be implemented, at least in part, using an NN. Different statistical language models used in different ASR models may utilize any known mechanism to perform the statistical language model function with different performance levels and different computational requirements.

An ASR model may optionally include an additional function. Different ASR models may include any number (including 0) of additional functions beyond the decoder, acoustic model, and statistical language model functions that some ASR models include.

Different criteria may be used to determine which service handler to use for an incoming request. The service level may be determined based on one criterion or based on a combination of criteria. In some cases, a service level may be designated with the request and the received service level used to determine which service handler (such as which ASR model) to use. In other cases, some aspect of the request or the data to be processed can be used to determine the service level and/or which service handler to use. Examples of this include a preassigned service level associated with the party originating the request (e.g. different service levels for different customers or particular devices based on a price-based quality-of-service guarantee, a characteristic of the originating device or user, or some other predetermined requirement of that party), or a noise-level in the data stream since speech in audio with low noise can be recognized with acceptable accuracy using less computing resource intensive models than speech in audio with high noise.

In some embodiments, a status of the system or systems providing the service may be used to determine the service level. A current load of the server handling the request may be used to determine the service level so that if the server load is low, the request can be serviced with a higher performance using more computing resources. Conversely, if the server load is high, the request can be serviced with a lower performance using fewer computing resources.

In some embodiments, a request for service may be received and put into a queue until the request can be serviced. Once the request is at the head of the queue and the system is able to handle the request, a service level (or particular service handler) may be assigned to the request based on the depth of the queue at that time or other estimates of an anticipated load going forward. In some embodiments, the queue depth may be compared to a threshold and if the queue depth is less than the threshold, the request may be assigned a higher level of service and/or serviced with a higher performance service handler with a lower capacity. If the queue depth is above the threshold, the request may be assigned a lower level of service and/or serviced with a lower performance service handler with a higher capacity. Other embodiments may utilize more than 2 service levels and use multiple thresholds of queue depth to determine the service level and/or service handler performance. The thresholds may be dynamically modified in some embodiments based on other criteria such as those discussed elsewhere in this disclosure. The use of queue depth to assign a service level may be used for any type of service, including those services which may take a long time (e.g. over a few ms), such as speech recognition, as the queue depth may be a good predictor of future loading as opposed to a backwards-looking measure of loading such as a current load on the server. Essentially, assigning a service level based on queue depth is useful to provide an appropriately responsive user experience without, necessarily, any regard for absolute compute resource requirements. Whereas, assigning a service level based on server load is useful to minimize over-provisioning of compute resources without, necessarily, any regard for a guaranteed responsiveness of the user experience.

Other forward-looking measures of anticipated server load may be used in some embodiments in place of or in conjunction with the queue depth. Some non-limiting examples of measures that could be used to estimate an anticipated server load include recent traffic statistics such as a number of queries per second (qps) and/or an average query processing duration over the past minute. Such predictions of future server loads may help the load supervisor to make better decisions when assigning a service level to a request. Some embodiments may also use other measures, such as a global energy budget to help determine which service level to assign to a request if different service levels may consume different amounts of power.

Systems where the service is automatic speech recognition (ASR) may utilize any of the criteria described above to determine the service level and/or ASR model to use but may utilize other criteria in addition to or instead of those described above. An example of a criterion that may be useful for determining a service level for ASR is an acoustic attribute such as signal-to-noise ratio (SNR), a spectral signal-to-noise ratio (SSNR), or a voice characterization. Measurements can be made on the incoming audio data and then used to determine a service level for the ASR. In some embodiments, such criteria may be measured on an ongoing basis and the ASR model varied during the ASR process. In some embodiments, a wake phrase may have been recognized locally before the stream of audio data was sent and the acoustic attribute determined by measurements taken on the audio data recognized as the wake phrase. So, for example, if the SNR is high (e.g. audio captured in a quiet room) an ASR model with lower performance may be used and if the SNR is low (e.g. audio with a lot of noise) a high performance ASR model may be used to enable accurate ASR even with the high noise.

Another criterion that may be used to determine an ASR service level is an estimated ASR performance measure such as a confidence score. This can be calculated by a confidence engine using confidence scores of the predicted text of prior sample windows within the current stream of audio data or on one or more recent streams of audio data from the same source.

Yet, another criterion that may be used to determine an ASR service level is user behavior, such as emotion estimation based on previously decoded text or voice attributes. It may also be possible to use information from a conversation state, such as domain of conversation or recognized entity names, or other information derived from previously decoded speech to set the ASR service level. Information about a running foreground app or type of client device sending the request may also be used to help set the ASR service level. For example if the foreground app is a light switch controller, this may only utilize a small vocabulary and therefore have a low need for acoustic model accuracy, whereas a contact list browser which may have names from multiple cultures and little grammatical context may indicate a need for high acoustic model accuracy.

Reference now is made in detail to the examples illustrated in the accompanying drawings and discussed below.

FIG. 1 shows a block diagram of an embodiment of a system 100 for performing automated speech recognition (ASR) on audio data. The system 100 includes a queue manager 110 configured to receive a request 105 to perform ASR on audio data, add the request 105 to a queue of incoming requests, and determine a queue depth representing a number of requests in the queue at a given time. The requests 105 may come from within a monolithic application that is included in the system 100, from separate application(s) running on the same computer as the system 100, from application(s) running on other computers sending the requests 105 over a network to the system 100, or any combination thereof. In some cases, the system 100 may act as an ASR service provider and take the requests 105 from a heterogeneous set of clients, such as interactive voice response (IVR) systems, smart speakers, visual voicemail, and/or voice dictation systems. Some of the requests 105 may be associated with pre-recorded audio data, but a request 105 may alternatively be associated with a stream of audio data being transmitted in real-time as the request 105 is received.

The system 100 also includes a load supervisor 120 configured to receive, at a time that the request is at a head of the queue, the request and the queue depth 115 from the queue manager 110 and assign a service level 125 for the request based, at least in part, on the queue depth 115 at the time that the request is at the head of the queue. In some embodiments, the load supervisor 120 is further configured to assign a first service level for the request in response to the queue depth being below a first value and to assign a second service level for the request in response to the queue depth being above the first value. In some embodiments the queue manager 110 and the load supervisor 120 may be integrated into a single application running on a single server, be separate applications running on a single server, or may be separate applications running on separate servers.

Additionally, the system 100 includes a speech-to-text converter 131 configured to receive the assigned service level 125 for the request from the load supervisor 120 and select an ASR model 141 for the request based on the received service level 125. The speech-to-text converter 131 may include two or more ASR models, such as ASR1 141, ASR2 142, and some embodiments may include additional ASR models such as ASRn 143. The different ASR models 141-143 may provide for different performance (e.g. accuracy and/or latency) but with different requirements for computing resources. So for example, ASR1 141 may provide for a baseline of accuracy and provide a capacity to allow up to 5 instantiations of ASR1 141 (performing ASR on up to 5 streams of audio data) simultaneously on a given server, while ASR2 142 may provide an accuracy rate that is lower than the baseline (such as up to 5% lower than the accuracy rate of ASR1 141) but provide a capacity to allow up to 15 instantiations of ASR 2 142 (performing ASR on up to 15 streams of audio data) simultaneously on the same server providing three times the capacity as ASR1 141. Additional ASR models, such as ASRn 143, may provide for progressively lower accuracy but with progressively higher capacity. Thus, the speech-to-text converter 131 may select a first ASR model 141 for use with the audio data in response to receiving the first service level and to select a second ASR model 142 that uses fewer computing resources and has a lower accuracy than the first ASR model 141 for use with the audio data in response to receiving the second service level. In some embodiments, the load supervisor 120 may be integrated with the speech-to-text converter 131 and receive the queue depth from the queue manager 110 and directly choose an ASR model based on the queue depth without an explicit assignment of a service level. In other embodiments the entire system 100 may be integrated into a single application running on a single server, but embodiments include those that break the system 100 into multiple applications running on multiple servers communicating over a network, including an embodiment where the speech-to-text converter 131 is running on a separate server from the other components of the system 100.

The different ASR models 141-143 may be created in any functional way, but in embodiments, some ASR models 141-143 may be built from components, such as a decoder, an acoustic model, and a statistical language model, although other ASR models 141-143 may be built as an end-to-end ASR model without separable components. As a non-limiting example, ASR1 141 may have a different decoder, and/or a different acoustic model, and/or a different statistical language model, than ASR2 142. In some embodiments, one or more of the ASR models 141-143 may include another function that another ASR model doesn't include.

The speech-to-text converter 131 also receives the audio data (not shown in FIG. 1) associated with the request and performs ASR on the audio data using the selected ASR model, such as ASR1 141, to generate text 195 from the audio data. The audio data, which may have an unknown length at the time that the request is at the head of the queue and/or may include a stream of audio data, may be buffered in the queue with the request and be managed by the queue manager 110, or may be buffered separately and made available to the speech-to-text converter 131 at the time the request is passed to the speech-to-text converter 131.

In some embodiments, the system 100 includes multiple servers 130 providing the speech-to-text converter service, such as a first server acting as the speech-to-text converter 131, a second server 132, and a third server 133, although embodiments may include any number of servers 130. In such embodiments, the load supervisor 120 may choose a server from a set of available servers 130 configured to act as the speech-to-text converter 131 and send the request to the chosen server with a tag indicating the assigned service level. Any technique may be used to select the server and the load supervisor 120. In some embodiments the server may be selected based, at least in part, on information included with the request, such as, but not limited to, a language spoken in the audio data, a client ID, a system ID, a contracted service level, a SNR, or a projected length of the audio data. Once the server has been chosen, the load supervisor 120 may assign the service level for the request further based, at least in part, on an existing load on the chosen server at the time that the request is at the head of the queue.

FIG. 1 may also be used to show a system 150 for managing processing of data. The system includes a queue manager 110 configured to receive a request to process data using a service (such as, but not limited to, ASR) and to add the request to a queue of incoming requests. The queue manager 110 can also determine a queue depth representing a number of requests in the queue at a given time. The system 150 also includes a load supervisor 120 configured to receive the request and the queue depth 115 from the queue manager 110 at a time that the request is at a head of the queue and assign a service level for the request based on the queue depth 115 at the time that the request is at the head of the queue. The system 150 may be used to assign the service level for requests for a service that has a first service level and a second service level that uses fewer computing resources than the first service level. Some embodiments of the system 150 may support services that have more than two service levels with different performance and capacity.

In such embodiments, the load supervisor 120 may assign different service levels to a particular request based on the queue depth 115 at the time that the particular request is at the head of the queue.

While the queue depth of the system 150 may be used in a variety of ways to set a service level for a request, in at least some embodiments, the load supervisor 120 can select the first service level for the request in response to the queue depth being below a first value and select the second service level for the request in response to the queue depth being above the first value. In other embodiments supporting more than two service levels, the load supervisor may select the first service level for the request in response to the queue depth being below a first value, select the second service level for the request in response to the queue depth being above the first value and below a second value that is greater than the first value, and select a third service level that uses fewer computing resources than the second service level for the request in response to the queue depth being above the second value. Alternatively, some embodiments of the load supervisor 120 may reject the request in response to the queue depth being above a predetermined value. One of ordinary skill in the art can see how additional service levels might be supported in this manner using additional values to assign ranges of queue depth to a particular service level.

In some embodiments, the values used to assign ranges of queue depth to a particular service level may be fixed at the time that the system is built, but in other embodiments, the values may be set to a fixed value at a configuration time for the system 150 or the load supervisor 120. In other embodiments, the values used to assign ranges of queue depth to a particular service level may be dynamically calculated based on one or more other parameters. In some embodiments, the load supervisor 120 may determine one or more of the values based on an existing load on a server providing the service at the time that the request is at the head of the queue. Additionally or alternatively, the load supervisor 120 may, in some cases, determine the one or more of the values based on information received with the request, such as a requested service level, a customer ID, or a device ID.

Once the service level for the request has been assigned, the system 150 can provide the service request and assigned service level to a service handler. The service handler may run on the same computer system that is acting as the system 150 for managing processing of data or may run on a separate computer system in communication with the system 150. In some embodiments, the data to be processed may be a stream of data and the service handler may include a stream processor to process the data as a stream using the selected service level. In some embodiments, there may be multiple servers 130 that can provide the service to process the request, that is to say a set of available servers 130. The system 150 can use any technique to choose a server from the set of available servers 130 providing the service to process the request, including, but not limited to, selecting a server based on loading of the set of available servers 130, based on physical locations or locations in a network topology of the set of available servers 130, and/or based on current configurations of the service handlers running on the set of available servers 130. The system 150 can then send the request to the chosen server with a tag indicating the selected service level.

Figure 2:
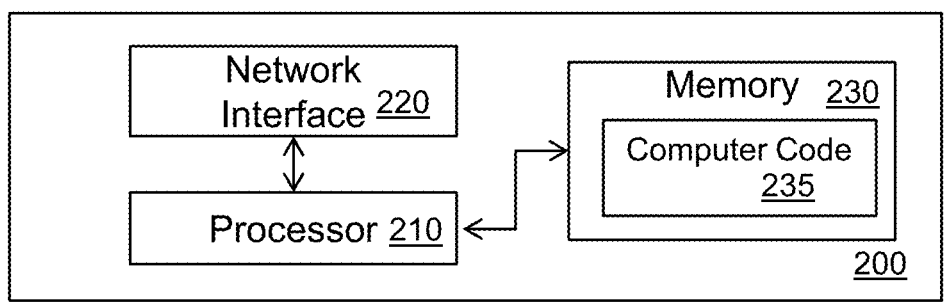
FIG. 2 shows a block diagram of a computer system suitable for embodiments of systems described herein.

FIG. 2 shows a block diagram of a computer system 200 suitable for embodiments of systems described herein. The computer system 200 includes a processor 210 coupled to a network interface 220 that can be used to communicate with other computer systems. The processor 210 is also coupled to one or more memory devices 230 which can be any combination of any type of computer readable memory, including, but not limited to, dynamic random access memory (DRAM), flash memory, and rotating magnetic media hard drives.

Figure 7A:
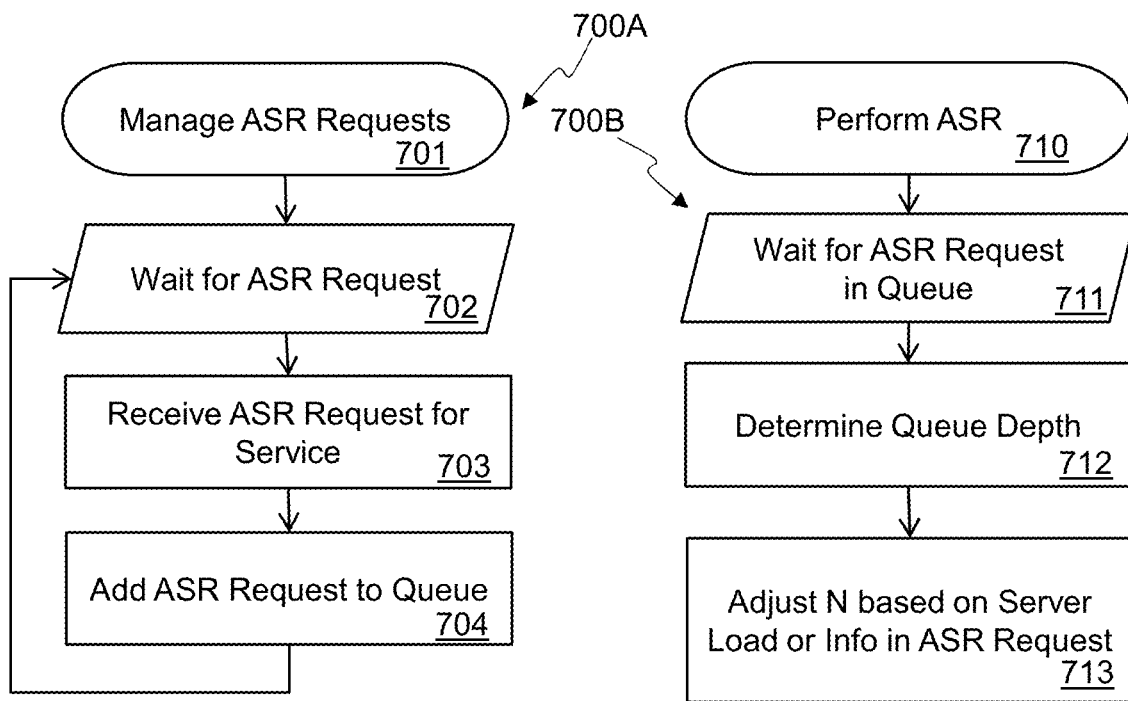
FIG. 7A and FIG. 7B are flowcharts of aspects of an embodiment of a method of performing automatic speech recognition (ASR) on audio data.

The one or more memory device 230 store computer code 235 that include instruction to program the processor to cause the system 200 to perform one or more of the methods described herein, including the methods shown in FIGS. 7A/B, 8A/B, and 9. As a non-limiting example, the one or more memory devices 230 may include a non-transitory machine readable medium including one or more instructions that in response to being executed by the processor 210 cause the system 200 to carry out a method of performing automatic speech recognition (ASR) on audio data. The method includes receiving a request to perform ASR on audio data and adding the request to a queue of incoming requests, the queue having a queue depth representing a number of requests in the queue at a given time. The queue depth is determined at a time that the request is at a head of the queue and a model for the ASR is selected from a set of two or more models based on the queue depth. The set of two or more models includes a first ASR model and a second ASR model requiring fewer computing resources and having a lower accuracy than the first ASR model. Audio data is received, and ASR performed on the audio data using the selected model.

Figure 3:
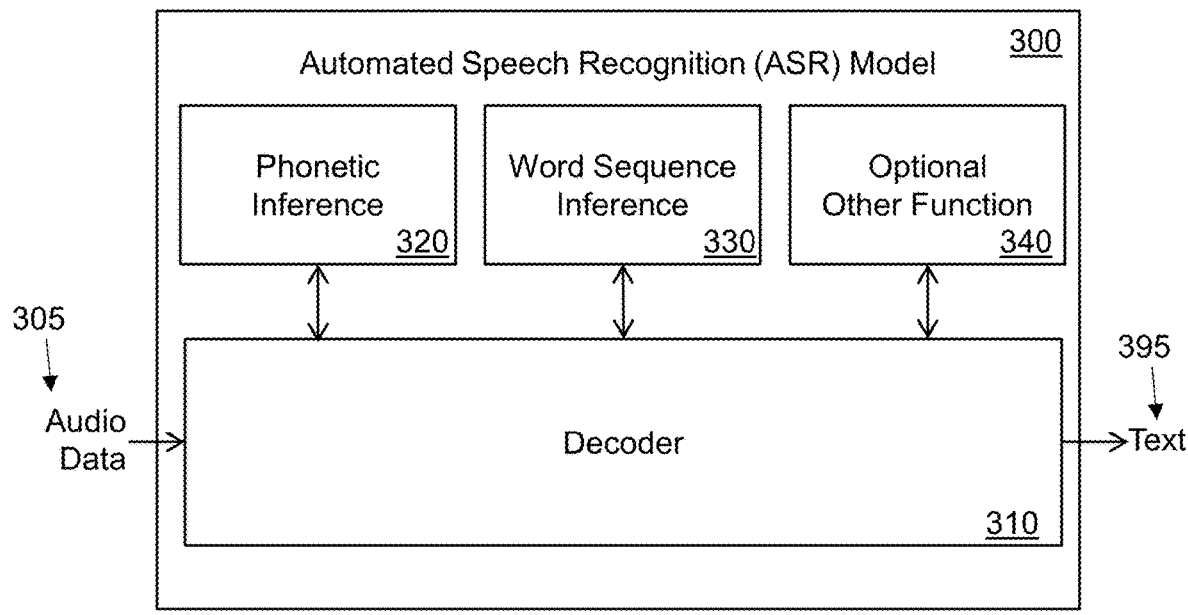
FIG. 3 shows a block diagram of an embodiment of an automated speech recognition model.

FIG. 3 shows a block diagram of an embodiment of an automated speech recognition (ASR) model 300. The ASR model 300 may represent one or more of the ASR models 141-143 shown in FIG. 1. The ASR model 300 includes a decoder 310 which receives the audio data 305 and may process that data 305 in any way, depending on the embodiment. The decoder 310 generates text 395 from the audio data 305 using phonetic inference 320, word sequence inference 330, and optionally other function(s) 340.

The decoder 310 may filter the audio data 305 (which may be an optional other function 340) to remove noise, perform equalization, or add pre-emphasis to the audio data 305, depending on the embodiment. In some embodiments, the decoder 310 may split the audio data 305, which may be a stream of data being received in real-time, into frames of a preset length. Any length may be used, depending on the embodiment, but in some embodiments, a frame may contain 10 ms of audio data. The decoder 310 may then operate on each incoming frame of data or may skip some frames, depending on the embodiment. Different decoders 310 may also execute at different time intervals, depending on the embodiment.

The decoder 310 may then perform additional signal processing on a frame of audio data to extract features from the frame of audio data. The processing can take any form but may include applying a discrete Fourier transform (DFT) to the frame to generate a spectrogram for the frame. Any type of DFT may be used including a fast Fourier transform (FFT). The spectrogram may be further processed to extract features to be sent to the acoustic model for phonetic inference 320. Any number of features may be extracted for each processed frame but may typically be in the range of 20-50 features. Any type of processing of the spectrogram may be used to generate the features, including simple histogram analysis of the spectrogram, but in some embodiments, mel frequency analysis and cepstral analysis may be used to extract the features from the full spectrogram. Mel frequency analysis and cepstral analysis together may be used to extract mel frequency cepstral coefficients (MFCC) which may be used as at least some of the features for the frame. Some embodiments may also generate MFCC deltas (based on changes in frequencies) and/or MFCC delta-deltas (changes in changes in frequencies) in addition to (or instead of) MFCCs as the features for the frame. Different ASR models may use different decoders that have different functionality, such as, but not limited to, different frame sizes, different frame skipping algorithms, different DFT implementations, and/or extraction of different features.

The decoder 310 can then provide the extracted features for a frame to an acoustic model to perform phonetic inference 320 which generates phonemes (or senones) from the features. In some embodiments, an acoustic model may be a hidden Markov model but may alternatively be a neural network (NN). In some cases, an acoustic model NN may include convolutional layers that learn features across frequencies in a spectrogram, long short-term memory (LSTM) recurrent layers that learn features across captured audio frames, fully connected layers, other types of layers, or any combination thereof. Different acoustic models used in different ASR models may utilize any known mechanism to perform the phonetic inference 320 function with different performance levels and different computational requirements.

The decoder 310 may provide the phonemes (or senones) inferred by the acoustic model to a statistical language model to perform word sequence inference 330. A statistical language model may be implemented as an n-gram model which provides the probability of a word sequence being spoken. The size and complexity of an n-gram language model is driven primarily by the vocabulary size and depth of n-gram (i.e. the length of the sequence of words used to predict the next word). In some embodiments, the search beam width or top-n heap size may vary between statistical language models to vary the performance/capacity tradeoff.

A statistical language model may also be implemented, at least in part, using an NN. A statistical language model NN may utilize an encoder-decoder technique such as a transformer neural network. A further enhancement of the encoder-decoder technique that may be used in some embodiments of a statistical language model is the bidirectional encoder representations from transformers (BERT) which uses a masked language model to remove the unidirectionality constraint of the transformer neural network. Different statistical language models used in different ASR models may utilize any known mechanism to perform the word sequence inference 330 function with different performance levels and different computational requirements.

The ASR model 300 may optionally include an additional function 340. The additional function 340 may include a neural language model (NLM) rescoring step that runs after candidate transcripts have been generated for the audio data 305, which may be a compute intensive process. NLM rescoring may cause a more "linguistically correct" hypothesis to be selected from the candidate transcripts. Another additional function 340 that some ASR models may include is a noise removal filter or resampling function to change the sample rate of the input audio before it is processed which may have an impact on the overall computing resource requirements of the ASR model. Different ASR models may include any number (including 0) of additional functions 340 beyond the decoder 310, the phonetic inference 320, and the word sequence inference 330 functions. So a first ASR model may include a function that is not included in a second ASR model.

Figure 4:
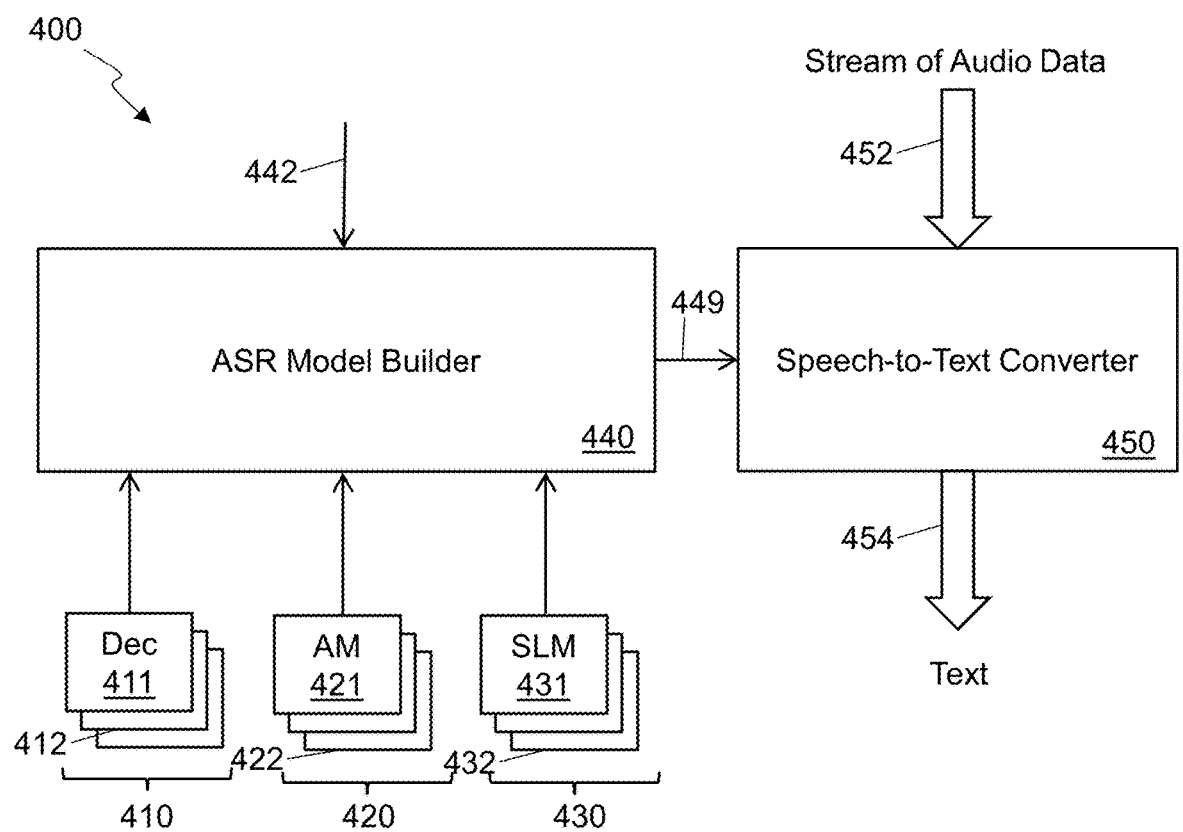
FIG. 4 shows a block diagram of an alternative embodiment of a system for performing automated speech recognition (ASR) on a stream of audio data.

FIG. 4 shows a block diagram of an alternative embodiment of a system 400 for performing automated speech recognition (ASR) on a stream of audio data 452. The system 400 includes one or more decoders 410, one or more acoustic models 420, and one or more statistical language models 430 that can be accessed by an ASR model builder 440. The ASR model builder 440 receives a first request 442 to perform ASR and constructs a first ASR model 449 for the request to perform ASR on a first stream of audio data 452. The ASR model builder 440 obtains a service level for the request 442 and selects, based on the service level, a decoder 411 from the one or more decoders 410, an acoustic model 421 from the one or more acoustic models 420, and a statistical language model 431 from the one or more statistical language models 430, to build the first ASR model 449. The first ASR model 449 is then passed to the speech-to-text converter 450 for use on the stream of audio data 452 to generate text output 454.

Later, the ASR model builder 440 may receive a second request to perform ASR and construct a second ASR model for the request to perform ASR on a second stream of audio data. The ASR model builder 440 obtains a lower service level for the request 442 and selects, based on the lower service level, a decoder 412 from the one or more decoders 410, an acoustic model 422 from the one or more acoustic models 420, and a statistical language model 432 from the one or more statistical language models 430, to build the second ASR model for use with the second stream of audio data that uses fewer computing resources and has a lower accuracy than the first ASR model constructed in response to obtaining a first service level for the request. The ASR model builder 440 may use any combination of the one or more decoders 410, the one or more acoustic models 420, and the one or more statistical language models 430 to build various ASR models, depending on the service level. Thus the ASR model builder may select a first acoustic model for the first ASR model and select a second acoustic model for the second ASR model. Likewise, the ASR model builder may select a first statistical language model for the first ASR model and select a second statistical language model for the second ASR model.

The decoders of the one or more decoders 410 may differ in many different ways, depending on the embodiment, but may vary in ways that have already been described above or in any other appropriate way that allows the overall ASR models built to have different performance/capacity characteristics. The acoustic models of the one or more acoustic models 420 may differ in many different ways, depending on the embodiment, but may vary in ways that have already been described above or in any other appropriate way that allows the overall ASR models built to have different performance/capacity characteristics. Furthermore, the statistical language models of the one or more statistical language models 430 may differ in many different ways, depending on the embodiment, but may vary in ways that have already been described above or in any other appropriate way that allows the overall ASR models built to have different performance/capacity characteristics.

The one or more acoustic models 420 may include a first acoustic model 421 that uses a first neural network (NN) having a first number of hidden layers and a second acoustic model 422 may include a second NN having a second number of hidden layers that is less than the first number. Additionally or alternatively, the one or more statistical language models 430 may include a first statistical language model 431 that uses a third neural network (NN) having a third number of hidden layers and a second statistical language model comprising a fourth NN having a fourth number of hidden layers that is less than the third number of hidden layers.

In addition, the system 400 may include optional other functions and the ASR model builder 440 may include an optional other function in some ASR models. So the ASR model builder may include, as a non-limiting example, a neural statistical language model in some constructed ASR models but not in others.

In some embodiments, the system 400 may also include a queue manager similar to the queue manager 110 of FIG. 1 that is configured to receive the request to perform ASR on the stream of audio data, add the request to a queue of incoming requests, and determine a queue depth representing a number of requests in the queue at a given time. The system 400 may also include a load supervisor similar to the load supervisor 120 of FIG. 1 that is configured to receive the request and the queue depth from the queue manager at a time that the request is at a head of the queue and assign the service level for the request based on the queue depth at the time that the request is at the head of the queue. A length of the stream of audio data may be unknown at the time that the request is at the head of the queue.

Figure 5A:
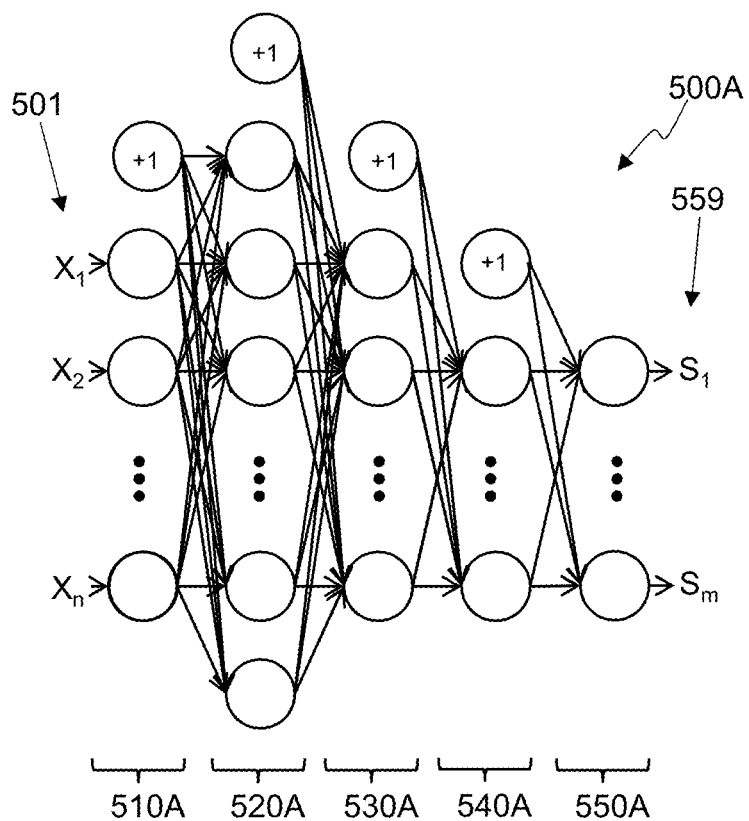
FIG. 5A and FIG. 5B show embodiments of neural networks that utilize different amounts of computing resources.
Figure 5B:
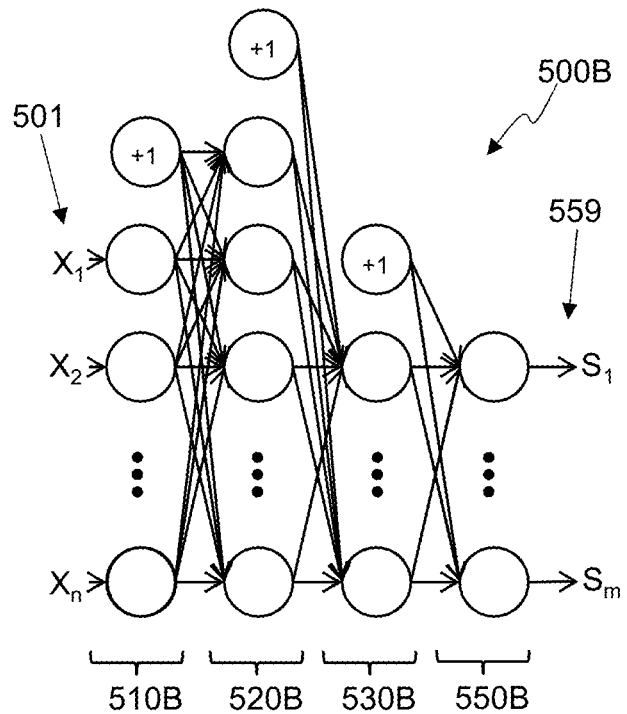

FIG. 5A and FIG. 5B show embodiments of two neural networks (NNs) that utilize different amounts of computing resources, a first NN 500A and a second NN 500B. While the NNs 500A/B shown may not represent an NN of an actual embodiment used in an ASR system, they are generally representative of NNs that might be useful in an ASR system. The NNs 500A/B shown are multilayer perceptron neural networks but one of ordinary skill will understand that the concepts discussed herein can be applied to other types of NNs such as a transformer neural network, a neural network with recurrent nodes, a neural network with long short-term memory nodes, a neural network with gated recurrent nodes, or a neural network with convolutional layers, to name a few possibilities.

Both the first NN 500A and the second NN 500B have "n" inputs 501 and "m" outputs 559 as they may both be used for the same function, such as two different versions of an acoustic model or two different versions of a statistical language model. The number of inputs and outputs may vary depending on the embodiment and the function of the NN, such as whether it is used in an acoustic model or a statistical language model. Each NN 500A/B has a number of internal nodes, or artificial neurons, that implement activation functions based on inputs received. The activation functions may vary between embodiments and may be linear or nonlinear. The artificial neurons may be organized into layers. The first NN 500A has an input layer 510A, three hidden layers, 520A, 530A, 540A, and an output layer 550A. The second NN has an input later 510B, two hidden layers 520B, 530B, and an output layer 550B. So a system may include a first ASR model using a first neural network (NN) 500A having a first number of hidden layers to perform a function, and a second ASR model comprising a second NN 500B having a second number of hidden layers that is less than the first number to perform the function where the function can be any function of the ASR model, including phonetic inference using an acoustic model, word sequence inference using a statistical language model, or another function. Note that the second NN 500B with fewer hidden layers than the first NN 500A may require fewer computational resources to execute than the first NN 500A.

FIGS. 6A and 6B respectively show a first table 600 and a second table 610 of experimental data from different ASR models. Experiments were conducted to measure the performance (e.g. accuracy rate and latency) and capacity of various ASR models. ASR models run as forks so having more forks provides a potential to provide more concurrent processing on a given server. Two sets of tests were executed with a speech-to-text converter running on equivalent servers. In one set of tests, the results of which are shown in the first table 600, the speech-to-text converter was configured to use up to 18 forks to support multiple ASR requests. In the other set of tests, the results of which are shown in the second table 610, the speech-to-text converter was configured to use up to 64 forks to support multiple ASR requests. Note that both tables 600, 610 are sorted in order of increasing capacity.

Sixteen different ASR models were created and assigned an ID (from 1 to 16) as shown in the first column of each table 600, 610. The same 16 ASR models were used for both sets of tests. The 16 ASR models were constructed by selecting either decoder A or decoder B, one of four different acoustic models, one of two different statistical language models, and optionally including one additional function as shown in columns 2-5. The two different decoders vary in several ways, but decoder A runs once per frame of audio while decoder B runs one for every three frames of audio. The four different acoustic models include two acoustic models for each decoder, so acoustic models 1 and 2 are designed to operate with decoder A while acoustic models 3 and 4 are designed to operate with decoder B. The four acoustic models used for testing use neural networks (NNs) with different configurations, such as different types of layers (e.g. convolutional layers, long short-term memory recurrent layers, or fully connected layers) and/or different numbers of hidden layers. So for example acoustic model 1 has more hidden layers than acoustic model 2 and acoustic model 3 has more hidden layers than acoustic model 4. The statistical language model is selected from either a n-gram based hidden statistical language model (SLM in the "Language Model" column) or a combination of the SLM and an NN-based neural statistical language model (NLM in the "Language Model" column).

The optional other function included in some ASR models is a neural language model rescoring that runs after candidate transcripts have been generated. This may cause a more "linguistically correct" hypothesis to be selected from the candidate transcripts. The "Other Function" column shows whether or not a particular ASR includes this functionality.

For each tested configuration, audio queries were sent to the server using various numbers of simultaneous connections (4, 8, 12, . . . ). The highest connection count where 95th percentile final response latency was less than 1 second was taken as the capacity, which is shown in the "Capacity" column. Note that results were gathered for certain values (such as 4, 8, 12, . . . ) and linearly interpolated between those points to estimate the capacity.

In addition, accuracy tests were executed using standard English benchmarks. The "Accuracy Decrease" column reports the relative increase in word error rate relative to ASR model 3 which is shown in the first row of each table 600, 610 while the 95th percentile first transcript latency (in ms) is shown in the final column of each table 600, 610. Note that first transcript latency (the "Latency" column) is the time from when the first audio data is sent until the first partial transcript (e.g. a transcript for the first 100 ms of audio data) is received in response. The final response latency (the latency measure used to calculate the "Capacity" column) is the time from when the last audio data is sent until the final transcript is received. While both latency measures are important, the final response latency may be a better measure of user-perceived responsiveness, which is why that measure was used to determine the capacity of the system.

The capacity for the baseline configuration, ASR model 3 (the ASR model initially identified for potential use), was found to be about 5 simultaneous ASR operations (the difference between the 4 simultaneous ASR operations shown in the first table 600 and the 5 simultaneous ASR operations shown in the second table 610 is believed to be well within the uncertainty level of the measurements). The best configuration was found to be ASR model 1 (highlighted in both tables 600, 610), which increased the capacity to 9 simultaneous ASR operations while slightly increasing the accuracy (0.76% better accuracy than ASR model 3) with only a moderate increase in latency. Thus, it was determined that for at least one embodiment, ASR model 1 could be used for ASR requests having a higher service level, no matter whether a system is configured to use 18 or 64 forks.

In systems that are configured to use only 18 forks for ASR, such as systems that may use the same server for other functions, the data in the first table indicates that ASR model 9 (highlighted in table 600) may be a good selection for use with ASR requests having a lower service level because it is an ASR model with higher capacity at the cost of somewhat reduced performance as compared to ASR model 1. ASR model 9 has only about 1.5% lower accuracy than ASR model 1 but provides double the capacity (9 simultaneous ASR operations) at somewhat higher latency, but still well within acceptable limits. Note that ASR models with a capacity above the number of available forks all had unacceptable first transcript latency. Given the experimental data shown in the first table 600, systems with only 18 forks available to handle ASR requests might only include two service levels, although other embodiments with other ASR models may provide more service levels.

Turning now to FIG. 6B with the second table 610 showing results for systems supporting up to 64 forks for ASR, note that ASR model 1 and other ASR models having a lower capacity provide essentially the same results as systems supporting only 18 forks as the capacity doesn't saturate either system configuration. But ASR models having a capacity over about 14 simultaneous ASR operations on a system allocating up to 18 forks show an increased capacity in a system with 64 forks available. So ASR model 9, which has a capacity of 18 on an 18 fork system, has a capacity of 28 simultaneous ASR operations on a system with 64 available forks, and ASR model 13 has a capacity of 53 simultaneous ASR operations on a 64 fork system. So given the experimental data shown in the second table 610, systems with 64 forks available to handle ASR requests might include three service levels, although other embodiments with other ASR models may provide more service levels. As an example, the highest service level requests may use ASR model 1. Requests having a next lower service level may use ASR model 9 which provides more than three times the capacity with only about 1.5% lower accuracy. The lowest service level ASR requests may use ASR model 13 which provides about nine times the capacity as the ASR model 1 but with an accuracy rate of about 15% less. So a server configured to act as the speech-to-text converter may be able to simultaneously perform ASR with a latency below a given threshold on at least twice as many streams of audio data using one ASR model (such as ASR model 9) than it can using another ASR model (such as ASR model 1). In some embodiments, a server configured to act as the speech-to-text converter may be able to simultaneously perform ASR on at least 50% more incoming audio streams by providing at least three times as many available concurrent threads using the second ASR model.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions or by configuration information for a field-programmable gate array (FPGA). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. Similarly, the configuration information for the FPGA may be provided to the FPGA and configure the FPGA to produce a machine which creates means for implementing the functions/acts specified in the flowchart and/or block diagram block or blocks.

These computer program instructions or FPGA configuration information may be stored in a computer readable medium that can direct a computer, other programmable data processing apparatus, FPGA, or other devices to function in a particular manner, such that the data stored in the computer readable medium produce an article of manufacture including instructions which implement the function/act specified in the flowchart and/or block diagram block or blocks. The computer program instructions or FPGA configuration information may also be loaded onto a computer, FPGA, other programmable data processing apparatus, or other devices to cause a series of operational steps to be performed on the computer, FPGA, other programmable apparatus, or other devices to produce a computer implemented process for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code comprising one or more executable instructions, or a block of circuitry, for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7B:
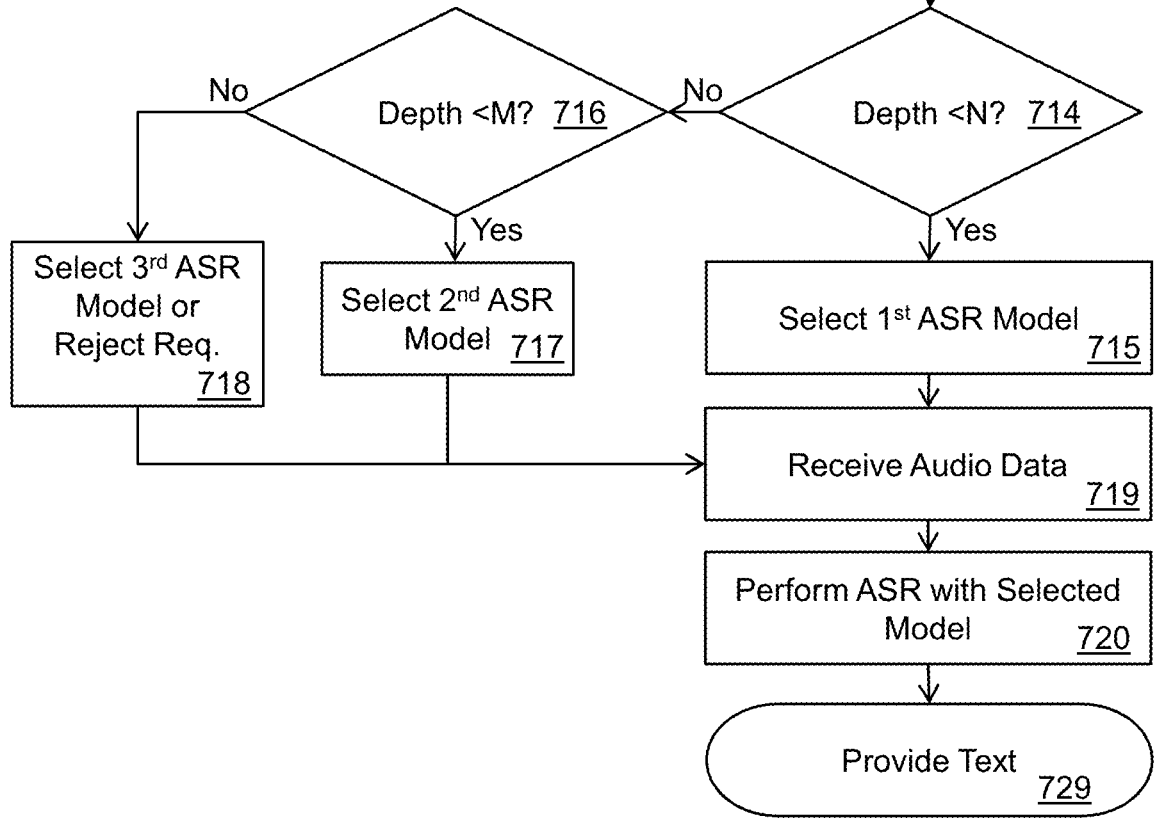

FIG. 7A and FIG. 7B are flowcharts 700A, 700B of aspects of an embodiment of a method of performing automatic speech recognition (ASR) on audio data. Various embodiments may implement the methods shown in flowcharts 700A, 700B, using one or more computing systems, splitting the functionality between physical computing systems as appropriate for the embodiment. The method of the first flowchart 700A manages 701 ASR requests by waiting 702 for ASR requests to be sent. It receives 703 a request to perform ASR on audio data and adds 704 the request to a queue of incoming requests. The queue has a queue depth representing a number of requests in the queue at a given time. The method of the first flowchart 700A then waits 702 again for the next ASR request to be sent. The method of the first flowchart 700A may be implemented by the queue manager 110 of FIG. 1.

The method shown in the second flowchart 700B performs 710 the ASR and may be performed by a combination of the load supervisor 120 and the speech-to-text converter 131 of FIG. 1. It waits 711 for an ASR request to be in the queue and determines 712 the queue depth at a time that the request is at a head of the queue. The method implemented by the flowchart 700B then selects 713-718 a model for the ASR from a set of two or more models based on the queue depth. The set of two or more models includes a first ASR model and a second ASR model requiring fewer computing resources and having a lower accuracy than the first ASR model. Some embodiments may include a third ASR model requiring fewer computing resources and having a lower accuracy than the second ASR model.

The different ASR models of the set of ASR models may differ in various ways to provide different performance/capacity tradeoffs. So for example, the first ASR model may include a first decoder module and the second ASR model may include a second decoder module different than the first decoder module. Alternatively or additionally, the first ASR model may include a first neural network (NN) that has a first number of hidden layers to perform a function and the second ASR model may include a second NN that has a second number of hidden layers that is less than the first number to perform the function. That function may include phonetic inference according to an acoustic model, word sequence inference according to a statistical language model, or any other function of the ASR model. Also, the first ASR model may include a function of the ASR that is not included in the second ASR model, such as, but not limited to, a neural statistical language model.

Different embodiments may select the model for the ASR in different ways, but in at least some embodiments, the queue depth is compared to one or more values to determine which ASR model to use. While the value(s) (including a first value N) may be determined in any appropriate way, the value(s) may be set to a fixed value at a configuration time, dynamically computed based on an existing load on a server selected to perform the ASR at the time that the request is at the head of the queue, or dynamically computed based on information received with the request. So in at least some embodiments, the value is adjusted 713 based on a server load or information in the ASR request.

The method of the second flowchart 700B shows an embodiment that compares the queue depth to values to determine which ASR model to use. It compares 714 the queue depth to a first value N and if the depth is less than N, selects 715 the first ASR model for the ASR. The queue depth may, in some embodiments, be compared 716 to a second value M and if the depth is less than M, the second ASR model level may be selected 717 for the ASR in response. Thus, if the queue depth is greater than M, the third ASR model may be selected 718. Alternatively in some embodiments, the method implemented may reject 718 the request if the queue depth is greater than M. The method of the second flowchart 700B then continues with receiving 719 the audio data and performing 720 the ASR on the audio data using the selected ASR model to provide 729 the text in response to the request.

In some embodiments, the selection of the ASR model may be divided into two steps with selection between a first service level and a second service level for the request based at least in part on the queue depth with the selected service level being passed to a speech-to-text service handler which selects an ASR model based on the selected service level. In some embodiments, there may be multiple speech-to-text service handlers running on different ASR servers, so the method may choose a server from a set of available ASR servers and send the request to the chosen server without, necessarily, requiring a tag indicating the selected service level. If a service level tag is included with a request, the chosen server can then select the model for the ASR based on the tag, receive 719 the audio data, and perform 720 the ASR on the audio data using the selected model so that it can provide 729 the text in response to the request. In some embodiments, the selection of the server may be based on the service level with the selected server only implementing one ASR model.

Figures 8A, 8B:
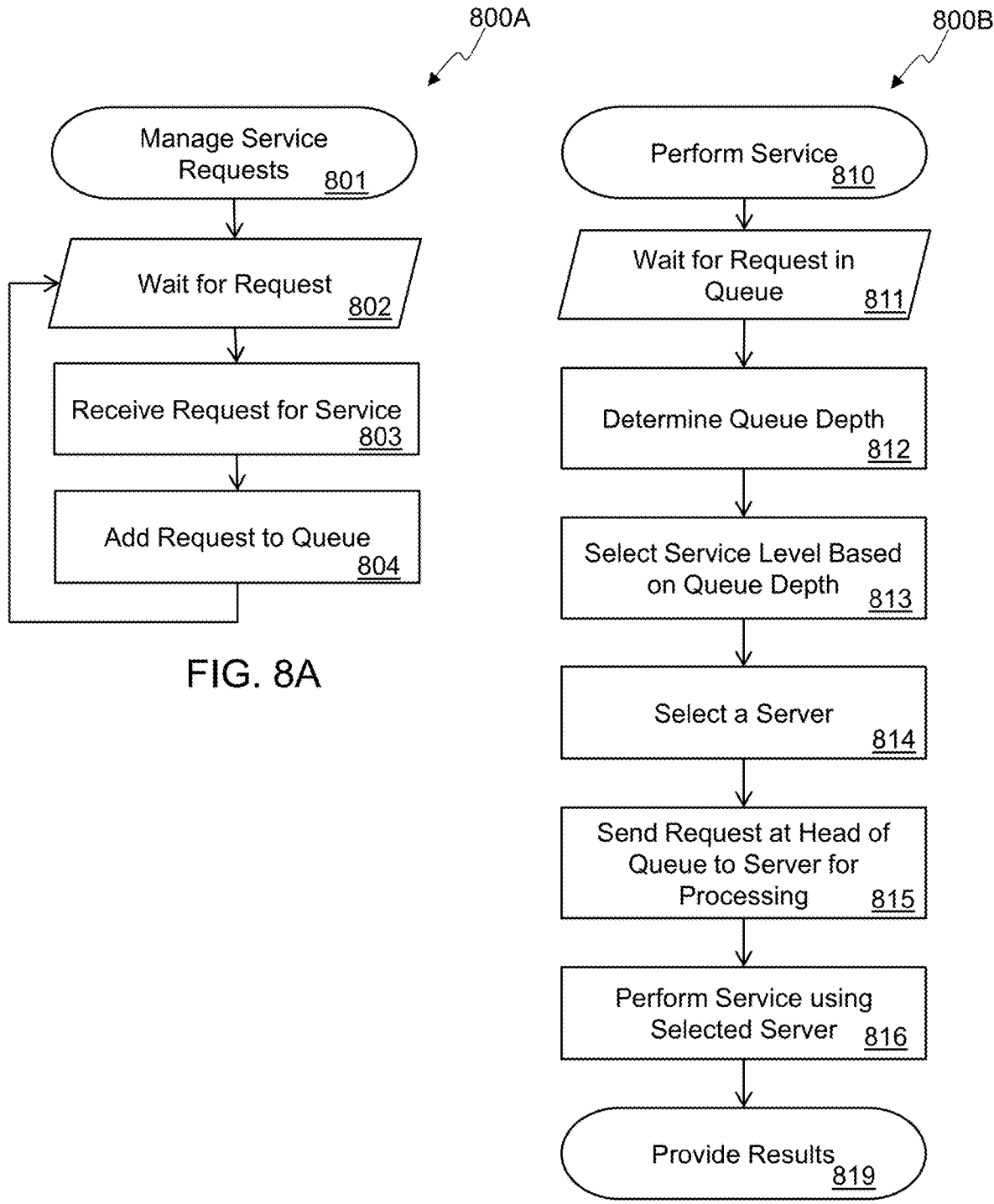
FIG. 8A and FIG. 8B are flowcharts of aspects of an embodiment of a method of managing a load for a server processing data.

FIG. 8A and FIG. 8B are flowcharts 800A, 800B of aspects of an embodiment of a method of managing a load for a server processing data. Various embodiments may implement the methods shown in flowcharts 800A, 800B, using one or more computing systems, splitting the functionality between physical computing systems as appropriate for the embodiment. While the type of service and data may vary between embodiments, the method shown by the flowcharts 800A, 800B is suitable where the data includes audio data and the processing includes automatic speech recognition, although that should not be taken as limiting. In addition, the data may be of known fixed length or may be streaming data where the length of the stream may not be known at the time that the request is received. The method of the first flowchart 800A manages 801 service requests by waiting 802 for requests to be sent. It receives 803 a request to perform the service and adds 804 the request to a queue of incoming requests. The method of the first flowchart 800A then waits 802 again for the next request to be sent. The method of the first flowchart 800A may be implemented by the queue manager 110 of FIG. 1.

The method of the second flowchart 800B performs 810 the service and may be performed, at least in part, by the load supervisor 120 of FIG. 1. It waits 811 for a request to be in the queue and determines 812 the queue depth at a time that the request is at a head of the queue. The method of the flowchart 800B then selects 813 a service level for the request based, at least in part, on the queue depth. There may be any number of service levels, depending on the embodiment, but some embodiments may include two or three different service levels. Processing the service at a first service level may provide for a baseline performance level and require a baseline of computing resources while processing the request at a second service level has a lower performance level and uses fewer computing resources than the first service level.

In some embodiments, the first service level for the request may be selected in response to the queue depth being below a first value and the second service level may be selected for the request in response to the queue depth being above the first value. In other embodiments, the first service level for the request may be selected in response to the queue depth being below a first value, the second service level for the request selected in response to the queue depth being above the first value and below a second value that is greater than the first value, and if the queue depth is above the second value, a third service level that uses fewer computing resources than the second service level for the request may be selected or, alternatively, the request may be rejected. The first value and/or second value may, as non-limiting examples, be set to a fixed value at a configuration time or may be dynamically computed based on other parameters such as an existing load on a server providing the service at the time that the request is at the head of the queue or information received with the request.

The method depicted in flowchart 800B may, in some embodiments, also include selecting 814 a server from a set of available servers providing the service to process the request and sending 815 the request to the chosen server with a tag indicating the selected service level. Any method may be used to select the server. Once the selected server receives the request, the service is performed 816 by the server and results are then provided 819 in response to the request.

Figure 9:
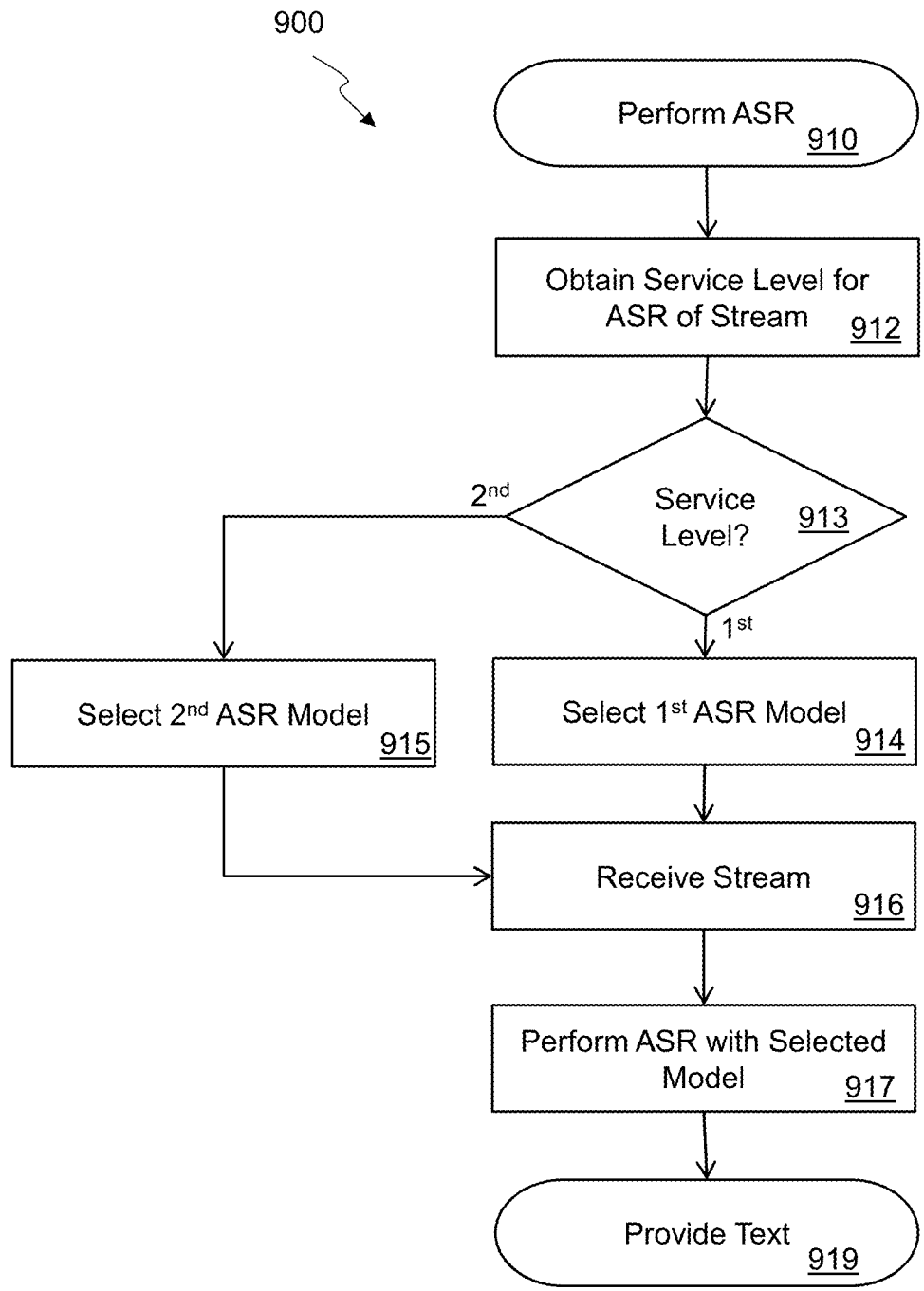
FIG. 9 is a flowchart of an alternative embodiment of a method of performing automatic speech recognition (ASR) of a stream of audio data.

FIG. 9 is a flowchart 900 of an alternative embodiment of a method of performing 910 automatic speech recognition (ASR) of a stream of audio data. The method implemented by the flowchart 900 includes obtaining 912 an indication of a service level to use for the ASR of the stream of audio data. The service level may be obtained by any appropriate method, including receiving a message from a load balancing system setting the service level for the request, receiving a tag with the request or with the data explicitly or implicitly describing the service level, managing a queue of requests and using a queue depth to determine the service level, using a current load of a server to determine the service level, or any combination of those or other methods.

The method shown by flowchart 900 continues by using 913 the service level to select a model for the ASR from a set of two or more models. The set of two or more models includes a first ASR model and a second ASR model requiring fewer computing resources and having a lower accuracy than the first ASR model. If the indication of the service level indicates a first service level, the first ASR model is selected 914. If the indication of the service level indicates a second service level, the second ASR model is selected 915. The two or more ASR models provide different performance/capacity tradeoffs and can be created as described elsewhere in this disclosure.

The stream of audio data is received 916 and ASR performed 917 of the stream of audio data using the selected model. Once ASR has been completed, text is provided 919 in response to the request.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "apparatus," "server," "circuitry," "module," "client," "computer," "logic," "FPGA," "system," or other terms. Furthermore, aspects of the various embodiments may take the form of a computer program product embodied in one or more computer-readable medium(s) having computer program code stored thereon. The phrases "computer program code" and "instructions" both explicitly include configuration information for an FPGA or other programmable logic as well as traditional binary computer instructions, and the term "processor" explicitly includes logic in an FPGA or other programmable logic configured by the configuration information in addition to a traditional processing core such as one in a central processing unit (CPU) or graphics processing unit (GPU). Furthermore, "executed" instructions explicitly includes electronic circuitry of an FPGA or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. In addition, the computer program code may be written in Verilog or VHDL or another hardware description language to generate configuration instructions for an FPGA or other programmable logic. The computer program code, if converted into an executable form and loaded onto a computer, FPGA, or other programmable apparatus, produces a computer implemented method. The instructions which execute on the computer, FPGA, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium is comprised by an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Examples of various embodiments are described in the following paragraphs:

Embodiment 1. A system for performing automated speech recognition (ASR) on audio data, the system comprising: a queue manager configured to receive a request to perform ASR on audio data, add the request to a queue of incoming requests, and determine a queue depth representing a number of requests in the queue at a given time; a load supervisor configured to receive, at a time that the request is at a head of the queue, the request and the queue depth from the queue manager and assign a service level for the request based, at least in part, on the queue depth at the time that the request is at the head of the queue; a speech-to-text converter configured to receive the assigned service level for the request from the load supervisor, select an ASR model for the request based on the received service level, receive the audio data associated with the request, and perform ASR on the audio data using the selected ASR model.

Embodiment 2. The system of embodiment 1, the load supervisor further configured to assign a first service level for the request in response to the queue depth being below a first value and to assign a second service level for the request in response to the queue depth being above the first value; and the speech-to-text converter further configured to select a first ASR model for use with the audio data in response to receiving the first service level and to select a second ASR model for use with the audio data in response to receiving the second service level, wherein the second ASR model uses fewer computing resources and has a lower accuracy than the first ASR model.

Embodiment 3. The system of embodiment 2, the first ASR model comprising a function that is not included in the second ASR model.

Embodiment 4. The system of embodiment 3, the function of the ASR comprising a neural statistical language model.

Embodiment 5. The system of any of embodiments 2-4, wherein a server configured to act as the speech-to-text converter can simultaneously perform ASR with a latency below a given threshold on at least twice as many streams of audio data using the second ASR model than it can using the first ASR model.

Embodiment 6. The system of any of embodiments 2-5, wherein a server configured to act as the speech-to-text converter can simultaneously perform ASR on at least 50% more incoming audio streams by providing at least three times as many available concurrent threads using the second ASR model.

Embodiment 7. The system of any of embodiments 2-6, the first ASR model comprising a first neural network (NN) having a first number of hidden layers to perform a function, and a second ASR model comprising a second NN having a second number of hidden layers that is less than the first number to perform the function.

Embodiment 8. The system of embodiment 7, the function comprising phonetic inference according to an acoustic model.

Embodiment 9. The system of embodiment 7 or 8, the function comprising word sequence inference according to a statistical language model.

Embodiment 10. The system of any of embodiments 2-9, the first ASR model comprising a first decoder module and the second ASR model comprising a second decoder module different than the first decoder module.

Embodiment 11. The system of any of embodiments 1-10, the load supervisor further configured to assign the service level for the request further based on an existing load of the speech-to-text converter at the time that the request is at the head of the queue.

Embodiment 12. The system of any of embodiments 1-11, wherein a length of the audio data is unknown at the time that the request is at the head of the queue.

Embodiment 13. The system of any of embodiments 1-12, wherein the audio data comprises a stream of audio data.

Embodiment 14. The system of any of embodiments 1-13, the load supervisor further configured to choose a server from a set of available servers configured to act as the speech-to-text converter and send the request to the chosen server with a tag indicating the assigned service level.

Embodiment 15. The system of embodiment 14, wherein the load supervisor is further configured to assign the service level for the request further based on an existing load on the chosen server at the time that the request is at the head of the queue.

Embodiment 16. The system of embodiment 14 or 15, wherein the load supervisor is further configured to select the server based on information included with the request, the information including a language spoken in the audio data, a client ID, a system ID, a contracted service level, or a projected length of the audio data.

Embodiment 17. A method of performing automatic speech recognition (ASR) on audio data, the method comprising: receiving a request to perform ASR on audio data; adding the request to a queue of incoming requests, the queue having a queue depth representing a number of requests in the queue at a given time; determining the queue depth at a time that the request is at a head of the queue; selecting a model for the ASR from a set of two or more models based on the queue depth, wherein the set of two or more models includes a first ASR model and a second ASR model, the second ASR model requiring fewer computing resources and having a lower accuracy than the first ASR model; receiving the audio data; and performing the ASR on the audio data using the selected ASR model.

Embodiment 18. The method of embodiment 17, the first ASR model comprising a function of the ASR that is not included in the second ASR model.

Embodiment 19. The method of embodiment 18, the function of the ASR comprising a neural statistical language model.

Embodiment 20. The method of any of embodiments 17-19, the first ASR model comprising a first neural network (NN) to perform a function and having a first number of hidden layers; and the second ASR model comprising a second NN to perform the function and having a second number of hidden layers that is less than the first number.

Embodiment 21. The method of embodiment 20, the function comprising phonetic inference according to an acoustic model.

Embodiment 22. The method of embodiment 20 or 21, the function comprising word sequence inference according to a statistical language model.

Embodiment 23. The method of any of embodiments 17-22, the first ASR model comprising a first decoder module and the second ASR model comprising a second decoder module different than the first decoder module.

Embodiment 24. The method of any of embodiments 17-23, wherein said selecting of the model for the ASR is further based on an existing load on a server selected to perform the ASR at the time that the request is at the head of the queue.

Embodiment 25. The method of any of embodiments 17-24, wherein a length of the audio data is unknown at the time that the request is at the head of the queue.

Embodiment 26. The method of any of embodiments 17-25, further comprising: selecting between a first service level and a second service level for the request based at least in part on the queue depth; choosing a server from a set of available ASR servers; and sending the request to the chosen server with a tag indicating the selected service level; wherein the chosen server is configured to select the model for the ASR based on the tag, receive the audio data, and perform the ASR on the audio data using the selected ASR model.

Embodiment 27. The method of any of embodiments 17-26, further comprising: selecting the first ASR model for the ASR in response to the queue depth being below a first value; and selecting the second ASR model level for the ASR in response to the queue depth being above the first value.

Embodiment 28. The method of embodiment 27, wherein the first value is set to a fixed value at a configuration time.

Embodiment 29. The method of embodiment 27, wherein the first value is computed based on an existing load on a server selected to perform the ASR at the time that the request is at the head of the queue.

Embodiment 30. The method of embodiment 27, wherein the first value is computed based on information received with the request.

Embodiment 31. The method of any of embodiments 17-30, further comprising: selecting the first ASR model for the ASR in response to the queue depth being below a first value; and selecting the second ASR model level for the ASR in response to the queue depth being above the first value and below a second value that is greater than the first value; and selecting a third ASR model for the ASR in response to the queue depth being above the second value, the third ASR model requiring fewer computing resources and having a lower accuracy than the second ASR model.

Embodiment 32. The method of any of embodiments 17-31, further comprising: receiving a second request to perform ASR on second audio data; adding the second request to the queue of incoming requests; determining the queue depth at a second time that the request is at the head of the queue; rejecting the request in response to the queue depth being above a predetermined value.

Embodiment 33. A non-transitory machine readable medium comprising one or more instructions that in response to being executed on a computing device cause the computing device to carry out a method of performing automatic speech recognition (ASR) on audio data, the method comprising: receiving a request to perform ASR on audio data; adding the request to a queue of incoming requests, the queue having a queue depth representing a number of requests in the queue at a given time; determining the queue depth at a time that the request is at a head of the queue; selecting a model for the ASR from a set of two or more models based on the queue depth, wherein the set of two or more models includes a first ASR model and a second ASR model, the second ASR model requiring fewer computing resources and having a lower accuracy than the first ASR model; receiving the audio data; and performing the ASR on the audio data using the selected ASR model.

Embodiment 34. The non-transitory machine readable medium of embodiment 33, the first ASR model comprising a function of the ASR that is not included in the second ASR model.

Embodiment 35. The non-transitory machine readable medium of embodiment 34, the function of the ASR comprising a neural statistical language model.

Embodiment 36. The non-transitory machine readable medium of any of embodiments 33-35, the first ASR model comprising a first neural network (NN) to perform a function and having a first number of hidden layers; and the second ASR model comprising a second NN to perform the function and having a second number of hidden layers that is less than the first number.

Embodiment 37. The non-transitory machine readable medium of embodiment 36, the function comprising phonetic inference according to an acoustic model.

Embodiment 38. The non-transitory machine readable medium of embodiment 36 or 37, the function comprising word sequence inference according to a statistical language model.

Embodiment 39. The non-transitory machine readable medium of any of embodiments 33-38, wherein said selecting of the model for the ASR is further based on an existing load on a server selected to perform the ASR at the time that the request is at the head of the queue.

Embodiment 40. The non-transitory machine readable medium of any of embodiments 33-39, wherein a length of audio data is unknown at the time that the request is at the head of the queue.

Embodiment 41. The non-transitory machine readable medium of any of embodiments 33-40, the method further comprising: selecting between a first service level and a second service level for the request based at least in part on the queue depth; choosing a server from a set of available ASR servers; and sending the request to the chosen server with a tag indicating the selected service level; wherein the chosen server is configured to select the model for the ASR based on the tag, receive the audio data, and perform the ASR on the audio data using the selected ASR model.

Embodiment 42. The non-transitory machine readable medium of any of embodiments 33-41, the method further comprising: selecting the first ASR model for the ASR in response to the queue depth being below a first value; and selecting the second ASR model level for the ASR in response to the queue depth being above the first value.

Embodiment 43. The non-transitory machine readable medium of embodiment 42, wherein the first value is set to a fixed value at a configuration time.

Embodiment 44. The non-transitory machine readable medium of embodiment 42, wherein the first value is computed based on an existing load on a server selected to perform the ASR at the time that the request is at the head of the queue.

Embodiment 45. The non-transitory machine readable medium of embodiment 42, wherein the first value is computed based on information received with the request.

Embodiment 46. The non-transitory machine readable medium of any of embodiments 33-45, the method further comprising: selecting the first ASR model for the ASR in response to the queue depth being below a first value; and selecting the second ASR model level for the ASR in response to the queue depth being above the first value and below a second value that is greater than the first value; and selecting a third ASR model for the ASR in response to the queue depth being above the second value, the third ASR model requiring fewer computing resources and having a lower accuracy than the second ASR model.

Embodiment 47. The non-transitory machine readable medium of embodiment 46, the method further comprising rejecting the request in response to the queue depth being above a predetermined value.

Embodiment 48. A method of managing a load for a server processing data, the method comprising: receiving a request to process data using a service having a first service level and a second service level that uses fewer computing resources than the first service level; adding the request to a queue of incoming requests, the queue having a queue depth representing a number of requests in the queue at a given time; determining the queue depth at a time that the request is at a head of the queue; selecting between the first service level and the second service level for the request based at least in part on the queue depth.

Embodiment 49. The method of embodiment 48, further comprising: selecting the first service level for the request in response to the queue depth being below a first value; and selecting the second service level for the request in response to the queue depth being above the first value.

Embodiment 50. The method of embodiment 49, wherein the first value is set to a fixed value at a configuration time.

Embodiment 51. The method of embodiment 49, wherein the first value is computed based on an existing load on a server providing the service at the time that the request is at the head of the queue.

Embodiment 52. The method of embodiment 49, wherein the first value is computed based on information received with the request.

Embodiment 53. The method of any of embodiments 48-52, further comprising: selecting the first service level for the request in response to the queue depth being below a first value; selecting the second service level for the request in response to the queue depth being above the first value and below a second value that is greater than the first value; and selecting a third service level that uses fewer computing resources than the second service level for the request in response to the queue depth being above the second value.

Embodiment 54. The method of any of embodiments 48-53, further comprising:
receiving a second request to process second data; adding the second request to the queue of incoming requests; determining the queue depth at a second time that the request is at the head of the queue; rejecting the request in response to the queue depth being above a predetermined value.

Embodiment 55. The method of any of embodiments 48-54, further comprising processing the data using the selected service level, wherein a single computing system manages the queue, selects the service level for the request, and processes the data.

Embodiment 56. The method of any of embodiments 48-55, wherein a load balancing system manages the queue and performs said selecting, the method further comprising: choosing, by the load balancing system, a server from a set of available servers providing the service to process the request; and sending the request to the chosen server with a tag indicating the selected service level.

Embodiment 57. The method of any of embodiments 48-56, wherein a length of the data is unknown at the time that the request is at the head of the queue.

Embodiment 58. The method of any of embodiments 48-57, wherein the data comprises audio data and the processing comprises automatic speech recognition.

Embodiment 59. A method of performing automatic speech recognition (ASR) of a stream of audio data, the method comprising: obtaining an indication of a service level to use for the ASR of the stream of audio data; selecting a model for the ASR from a set of two or more models based on the indication of the service level, wherein the set of two or more models includes a first ASR model and a second ASR model, the second ASR model requiring fewer computing resources and having a lower accuracy than the first ASR model; receiving the stream of audio data; and performing ASR of the stream of audio data using the selected ASR model.

Embodiment 60. The method of embodiment 59, the first ASR model comprising a function of the ASR that is not included in the second ASR model.

Embodiment 61. The method of embodiment 60, the function of the ASR comprising a neural statistical language model.

Embodiment 62. The method of any of embodiments 59-61, the first ASR model comprising a neural statistical language model and the second ASR model excluding a neural statistical language model.

Embodiment 63. The method of any of embodiments 59-62, the first ASR model comprising a first neural network (NN) to perform a function and having a first number of hidden layers; and the second ASR model comprising a second NN to perform the function and having a second number of hidden layers that is less than the first number.

Embodiment 64. The method of embodiment 63, the function comprising phonetic inference according to an acoustic model.

Embodiment 65. The method of embodiment 63 or 64, the function comprising word sequence inference according to a statistical language model.

Embodiment 66. The method of any of embodiments 59-65, the first ASR model comprising a first decoder module and the second ASR model comprising a second decoder module different than the first decoder module.

Embodiment 67. The method of any of embodiments 59-66, the set of two or more models includes a third ASR model that uses fewer computing resources than the second ASR model and has a lower accuracy than the second ASR model.

Embodiment 68. The method of any of embodiments 59-67, further comprising obtaining the indication of the service level to use for the ASR of the stream of audio data from a load balancing system separate from a system performing the ASR.

Embodiment 69. The method of any of embodiments 59-68, further comprising obtaining the indication of the service level to use for the ASR of the stream of audio data as a tag associated with the stream of audio data.

Embodiment 70. The method of any of embodiments 59-69, further comprising obtaining the indication of the service level to use for the ASR of the stream of audio data at least in part by evaluating a queue depth of a queue at a time that a request to perform the ASR of the stream of audio data is at a head of the queue, the queue used to hold one or more requests for ASR.

Embodiment 71. A non-transitory machine readable medium comprising one or more instructions that in response to being executed on a computing device cause the computing device to carry out any of the methods of embodiment 48 through 70.

Embodiment 72. A system for managing processing of data, the system comprising: a network interface; a processor coupled to the network interface; and one or more memory devices coupled to the processor, and storing instructions to program the processor to perform any of the methods of embodiment 48 through 70.

Embodiment 73. A system for managing processing of data, the system comprising: a queue manager configured to receive a request to process data using a service, add the request to a queue of incoming requests, and determine a queue depth representing a number of requests in the queue at a given time; a load supervisor configured to receive the request and the queue depth from the queue manager at a time that the request is at a head of the queue and assign a service level for the request based on the queue depth at the time that the request is at the head of the queue; wherein the service has a first service level and a second service level that uses less computing resource than the first service level.

Embodiment 74. The system of embodiment 73, the load supervisor further configured to: select the first service level for the request in response to the queue depth being below a first value; and select the second service level for the request in response to the queue depth being above the first value.

Embodiment 75. The system of embodiment 74, wherein the first value is set to a fixed value at a configuration time.

Embodiment 76. The system of embodiment 74, the load supervisor further configured to compute the first value based on an existing load on a server providing the service at the time that the request is at the head of the queue.

Embodiment 77. The system of embodiment 74, the load supervisor further configured to compute the first value based on information received with the request.

Embodiment 78. The system of any of embodiments 73-77, the load supervisor further configured to: select the first service level for the request in response to the queue depth being below a first value; and select the second service level for the request in response to the queue depth being above the first value and below a second value that is greater than the first value; and select a third service level that uses fewer computing resources than the second service level for the request in response to the queue depth being above the second value.

Embodiment 79. The system of any of embodiments 73-78, the load supervisor further configured to reject the request in response to the queue depth being above a predetermined value.

Embodiment 80. The system of any of embodiments 73-79, further comprising a stream processor to process the data as a stream using the selected service level.

Embodiment 81. The system of any of embodiments 73-80, the load supervisor further configured to: choose a server from a set of available servers providing the service to process the request; and send the request to the chosen server with a tag indicating the selected service level.

Embodiment 82. The system of any of embodiments 73-81, wherein a length of the data is unknown at the time that the request is at the head of the queue.

Embodiment 83. The system of any of embodiments 73-82, wherein the data comprises audio data and the service comprises automatic speech recognition.

Embodiment 84. A system for performing automated speech recognition (ASR) on a stream of audio data, the system comprising: one or more decoders; one or more acoustic models; one or more statistical language models; an ASR model builder configured to construct an ASR model for a request to perform ASR on a stream of audio data by obtaining a service level for the request and selecting, based on the service level, a decoder from the one or more decoders, an acoustic model from the one or more acoustic models, and a statistical language model from the one or more statistical language models, wherein a second ASR model constructed in response to obtaining a second service level for the request uses fewer computing resources and has a lower accuracy than a first ASR model constructed in response to obtaining a first service level for the request; and a speech-to-text converter configured to receive the stream of audio data associated with the request and perform ASR on the stream of audio data using the constructed ASR model.

Embodiment 85. The system of embodiment 84, the one or more acoustic models including a first acoustic model comprising a first neural network (NN) having a first number of hidden layers and a second acoustic model comprising a second NN having a second number of hidden layers that is less than the first number; and the ASR model builder configured to select the first acoustic model for the first ASR model and to select the second acoustic model for the second ASR model.

Embodiment 86. The system of embodiment 84 or 85, the one or more statistical language models including a first statistical language model comprising a first neural network (NN) having a first number of hidden layers and a second statistical language model comprising a second NN having a second number of hidden layers that is less than the first number; and the ASR model builder configured to select the first statistical language model for the first ASR model and to select the second statistical language model for the second ASR model.

Embodiment 87. The system of any of embodiments 84-86, further comprising a neural statistical language model, the ASR model builder further configured to include the neural statistical language model in the first ASR model but exclude it from the second ASR model.

Embodiment 88. The system of any of embodiments 84-87, wherein the speech-to-text converter can simultaneously perform ASR with a latency below a given threshold on at least twice as many streams of audio data using the second ASR model than it can using the first ASR model.

Embodiment 89. The system of any of embodiments 84-88, wherein the speech-to-text converter can simultaneously perform ASR on at least 50% more incoming audio streams by providing at least three times as many available concurrent threads using the second ASR model.

Embodiment 90. The system of any of embodiments 84-89, one or more decoders including a first decoder and a second decoder that is different than the first decoder, the first ASR model comprising the first decoder and the second ASR model comprising the second decoder.

Embodiment 91. The system of any of embodiments 84-90, wherein a length of the stream of audio data is unknown at the time that the request is at the head of the queue.

Embodiment 92. The system of any of embodiments 84-91, further comprising: a queue manager that is configured to receive the request to perform ASR on the stream of audio data, add the request to a queue of incoming requests, and determine a queue depth representing a number of requests in the queue at a given time; a load supervisor that is configured to receive the request and the queue depth from the queue manager at a time that the request is at a head of the queue and assign the service level for the request based on the queue depth at the time that the request is at the head of the queue.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, π, 3.$\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments but should be defined only in accordance with the following claims and equivalents thereof.

What is claimed is:

1. A system for performing automated speech recognition (ASR) on audio data, the system comprising:
    a queue manager configured to receive a request to perform ASR on audio data, add the request to a queue of incoming requests, and determine a queue depth representing a number of requests in the queue at a given time;
    a load supervisor configured to receive, at a time that the request is at a head of the queue, the request and the queue depth from the queue manager and assign a service level for the request based, at least in part, on the queue depth at the time that the request is at the head of the queue;
    a speech-to-text converter configured to receive the assigned service level for the request from the load supervisor, select an ASR model for the request based on the received assigned service level, receive the audio data associated with the request, and perform ASR on the audio data using the selected ASR model.

2. The system of claim 1, the load supervisor further configured to assign a first service level for the request in response to the queue depth being below a first value and to assign a second service level for the request in response to the queue depth being above the first value; and
    the speech-to-text converter further configured to select a first ASR model for use with the audio data in response to receiving the first service level and to select a second ASR model for use with the audio data in response to receiving the second service level, wherein the second ASR model uses fewer computing resources and has a lower accuracy than the first ASR model.

3. The system of claim 2, the first ASR model comprising a function that is not included in the second ASR model.

4. The system of claim 3, the function of the ASR comprising a neural statistical language model.

5. The system of claim 2, the first ASR model comprising a first neural network (NN) having a first number of hidden layers to perform a function, and a second ASR model comprising a second NN having a second number of hidden layers that is less than the first number to perform the function.

6. The system of claim 5, the function comprising phonetic inference according to an acoustic model.

7. The system of claim 5, the function comprising word sequence inference according to a statistical language model.

8. The system of claim 2, the first ASR model comprising a first decoder module and the second ASR model comprising a second decoder module different than the first decoder module.

9. The system of claim 1, wherein a length of the audio data is unknown at the time that the request is at the head of the queue.

10. The system of claim 1, the load supervisor further configured to choose a server from a set of available servers configured to act as the speech-to-text converter and send the request to the chosen server with a tag indicating the received assigned service level.

11. The system of claim 10, wherein the load supervisor is further configured to assign the service level for the request further based on an existing load on the chosen server at the time that the request is at the head of the queue.

12. A method of performing automatic speech recognition (ASR) on audio data, the method comprising:
    receiving a request to perform ASR on audio data;
    adding the request to a queue of incoming requests, the queue having a queue depth representing a number of requests in the queue at a given time;
    determining the queue depth at a time that the request is at a head of the queue;
    selecting a model for the ASR from a set of two or more models based on the queue depth, wherein the set of two or more models includes a first ASR model and a second ASR model, the second ASR model requiring fewer computing resources and having a lower accuracy than the first ASR model;
    receiving the audio data; and
    performing the ASR on the audio data using the selected ASR model.

13. The method of claim 12, the first ASR model comprising a function of the ASR that is not included in the second ASR model.

14. The method of claim 13, the function of the ASR comprising a neural statistical language model.

15. The method of claim 12, the first ASR model comprising a first neural network (NN) to perform a function and having a first number of hidden layers; and
    the second ASR model comprising a second NN to perform the function and having a second number of hidden layers that is less than the first number.

16. The method of claim 15, the function comprising phonetic inference according to an acoustic model.

17. The method of claim 15, the function comprising word sequence inference according to a statistical language model.

18. The method of claim 12, wherein said selecting of the model for the ASR is further based on an existing load on a server selected to perform the ASR at the time that the request is at the head of the queue.

19. The method of claim 12, wherein a length of the audio data is unknown at the time that the request is at the head of the queue.

20. The method of claim 12, further comprising:
selecting between a first service level and a second service level for the request based at least in part on the queue depth;
choosing a server from a set of available ASR servers; and
sending the request to the chosen server with a tag indicating the selected service level;
wherein the chosen server is configured to select the model for the ASR based on the tag, receive the audio data, and perform the ASR on the audio data using the selected ASR model.

21. The method of claim 12, further comprising:
selecting the first ASR model for the ASR in response to the queue depth being below a first value; and
selecting the second ASR model level for the ASR in response to the queue depth being above the first value.

22. The method of claim 21, wherein the first value is computed based on an existing load on a server selected to perform the ASR at the time that the request is at the head of the queue.

23. The method of claim 21, wherein the first value is computed based on information received with the request.

24. The method of claim 12, further comprising:
selecting the first ASR model for the ASR in response to the queue depth being below a first value; and
selecting the second ASR model level for the ASR in response to the queue depth being above the first value and below a second value that is greater than the first value; and
selecting a third ASR model for the ASR in response to the queue depth being above the second value, the third ASR model requiring fewer computing resources and having a lower accuracy than the second ASR model.

25. A method of performing automatic speech recognition (ASR) on audio data, the method comprising:
receiving a request to perform ASR on audio data;
adding the request to a queue of incoming requests;
making a load-based decision;
selecting an ASR model from a set of two or more models based on the load-based decision, wherein the set of two or more models includes a first ASR model and a second ASR model, the second ASR model requiring fewer computing resources and having a lower accuracy than the first ASR model;
receiving the audio data; and
performing the ASR on the audio data using the selected ASR model.

26. The method of claim 25 wherein the load-based decision uses a forward-looking measure.

27. The method of claim 26 wherein the forward-looking measure is queue depth.

28. The method of claim 27, further comprising:
selecting the first ASR model in response to the queue depth being below a first value; and
selecting the second ASR model in response to the queue depth being above the first value.

29. The method of claim 28, wherein the first value is computed based on an existing load on a server selected to perform the ASR at a time that the request is at a head of the queue.

30. The method of claim 27, further comprising:
selecting the first ASR model in response to the queue depth being below a first value;
selecting the second ASR model in response to the queue depth being above the first value and below a second value that is greater than the first value; and
selecting a third ASR model in response to the queue depth being above the second value, the third ASR model requiring fewer computing resources and having a lower accuracy than the second ASR model.

31. The method of claim 25 wherein the load-based decision uses a backward-looking measure.

32. The method of claim 31 wherein the backward-looking measure is a current server load.

33. The method of claim 25, the first ASR model comprising a function of the ASR that is not included in the second ASR model.

34. The method of claim 25, the first ASR model comprising a first artificial neural network (ANN) to perform a function and having a first number of hidden layers; and
the second ASR model comprising a second ANN to perform the function and having a second number of hidden layers that is less than the first number of hidden layers.

35. The method of claim 34, the function comprising phonetic inference according to an acoustic model.

36. The method of claim 34, the function comprising word sequence inference according to a statistical language model.

37. The method of claim 25, wherein a length of the audio data is unknown at a time that the request is at a head of the queue.

38. The method of claim 25, further comprising:
selecting between a first service level and a second service level for the request based at least in part on the load-based decision;
choosing a server from a set of available ASR servers; and
sending the request to the chosen server with a tag indicating the selected service level;
wherein the chosen server is configured to select the ASR model based on the tag, receive the audio data, and perform the ASR on the audio data using the selected ASR model.

* * * * *